(12) United States Patent
Amano et al.

(10) Patent No.: US 10,546,383 B2
(45) Date of Patent: Jan. 28, 2020

(54) IMAGE PROCESSING DEVICE, OBJECT RECOGNIZING DEVICE, DEVICE CONTROL SYSTEM, IMAGE PROCESSING METHOD, AND COMPUTER-READABLE MEDIUM

(71) Applicant: Ricoh Company, Ltd., Tokyo (JP)

(72) Inventors: Seiya Amano, Kanagawa (JP); Hiroyoshi Sekiguchi, Kanagawa (JP); Soichiro Yokota, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 58 days.

(21) Appl. No.: 15/991,472

(22) Filed: May 29, 2018

(65) Prior Publication Data
US 2018/0276837 A1  Sep. 27, 2018

Related U.S. Application Data

(63) Continuation of application No. PCT/JP2016/086639, filed on Dec. 8, 2016.

(30) Foreign Application Priority Data

Dec. 10, 2015 (JP) .................................. 2015-241450

(51) Int. Cl.
*G06T 7/593* (2017.01)
*H04N 7/18* (2006.01)
(Continued)

(52) U.S. Cl.
CPC ................ *G06T 7/596* (2017.01); *G01C 3/06* (2013.01); *G06K 9/00228* (2013.01);
(Continued)

(58) Field of Classification Search
CPC . G06T 7/596; G06T 5/50; G06T 2207/10021; G06T 2207/30196;
(Continued)

(56) References Cited

U.S. PATENT DOCUMENTS

2007/0165931 A1* 7/2007 Higaki ............... G06K 9/00201
382/128
2010/0231717 A1 9/2010 Sasaki et al.
(Continued)

FOREIGN PATENT DOCUMENTS

JP 2011-128756 6/2011
JP 2012-253666 12/2012
(Continued)

OTHER PUBLICATIONS

Extended European Search Report dated Nov. 20, 2018 in corresponding European Patent Application No. 16873092.7, 7 pages.
(Continued)

*Primary Examiner* — Amandeep Saini
(74) *Attorney, Agent, or Firm* — Xsensus LLP

(57) ABSTRACT

An image processing device includes: a first generating unit configured to generate, based on a distance image generated from a plurality of taken images imaged by a plurality of imaging units in a travelling direction, and made from distance values corresponding to the travelling direction, a first image indicating a frequency distribution associating actual distances in a direction orthogonal to the travelling direction with the distance values; a second generating unit configured to generate, based on the distance image, a second image indicating a frequency distribution associating a horizontal direction of the distance image with the distance values; a first processing unit configured to detect a face of an object represented by the first image, using at least the first image; and a second processing unit configured to identify a type of the face of the object using at least the second image.

12 Claims, 24 Drawing Sheets

(51) Int. Cl.
  *G01C 3/06* (2006.01)
  *G06T 1/00* (2006.01)
  *G06K 9/46* (2006.01)
  *G06K 9/00* (2006.01)
  *G06K 9/62* (2006.01)
  *G06T 5/50* (2006.01)

(52) U.S. Cl.
  CPC ....... *G06K 9/00805* (2013.01); *G06K 9/4604* (2013.01); *G06K 9/4642* (2013.01); *G06K 9/6202* (2013.01); *G06T 1/00* (2013.01); *G06T 5/50* (2013.01); *G06T 7/593* (2017.01); *H04N 7/18* (2013.01); *G06T 2207/10021* (2013.01); *G06T 2207/30196* (2013.01); *G06T 2207/30261* (2013.01)

(58) Field of Classification Search
  CPC . G06T 2207/30261; G06T 7/593; G06T 1/00; G06K 9/00228; G06K 9/00805; G06K 9/4604; G06K 9/6202; G06K 9/4642; G01C 3/06; H04N 7/18
  USPC .......................................... 382/106
  See application file for complete search history.

(56) References Cited

U.S. PATENT DOCUMENTS

| | | |
|---|---|---|
| 2011/0050714 A1 | 3/2011 | Sekiguchi et al. |
| 2012/0242835 A1 | 9/2012 | Li et al. |
| 2012/0308119 A1 | 12/2012 | Ogata et al. |
| 2014/0254872 A1 | 9/2014 | Guan |
| 2015/0049195 A1 | 2/2015 | Ishigaki et al. |
| 2015/0294160 A1* | 10/2015 | Takahashi .......... G06K 9/00791 382/104 |
| 2015/0332103 A1 | 11/2015 | Yokota et al. |
| 2015/0334269 A1 | 11/2015 | Yokota et al. |
| 2015/0358610 A1 | 12/2015 | Takahashi et al. |
| 2015/0371093 A1* | 12/2015 | Tamura .................. G06T 7/593 382/103 |
| 2016/0014406 A1 | 1/2016 | Takahashi et al. |
| 2016/0019429 A1 | 1/2016 | Ishigaki et al. |
| 2016/0131579 A1 | 5/2016 | Sekiguchi et al. |

FOREIGN PATENT DOCUMENTS

| | | |
|---|---|---|
| JP | 2014-197378 | 10/2014 |
| JP | 2015-179302 A | 10/2015 |
| WO | WO 2015/182771 A1 | 12/2015 |

OTHER PUBLICATIONS

International Search Report dated Mar. 7, 2017 in PCT/JP2016/086639 filed on Dec. 8, 2016 ( with English translation).
Written Opinion dated Mar. 7, 2017 in PCT/JP2016/086639 filed on Dec. 8, 2016.

* cited by examiner

FIG.1
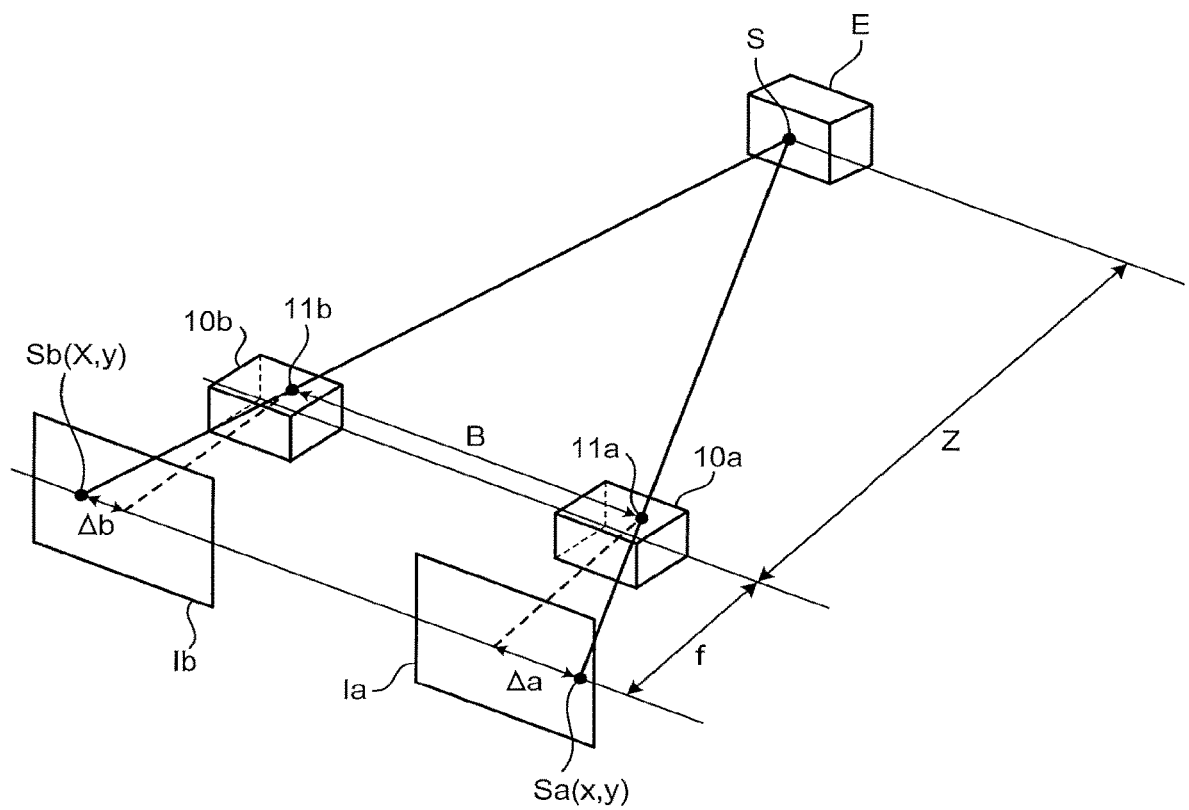
FIG.2
(a) 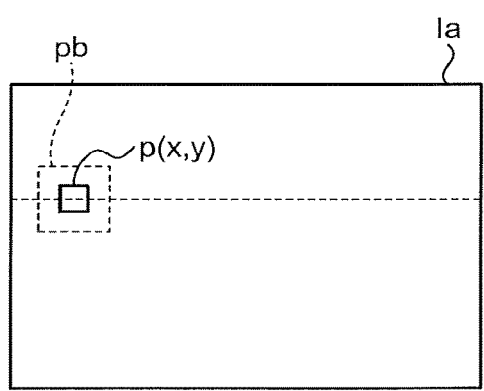   (b) 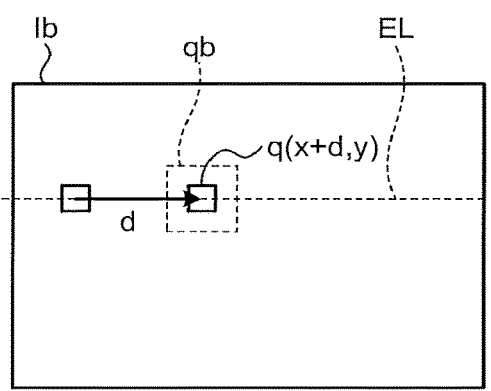

FIG.12
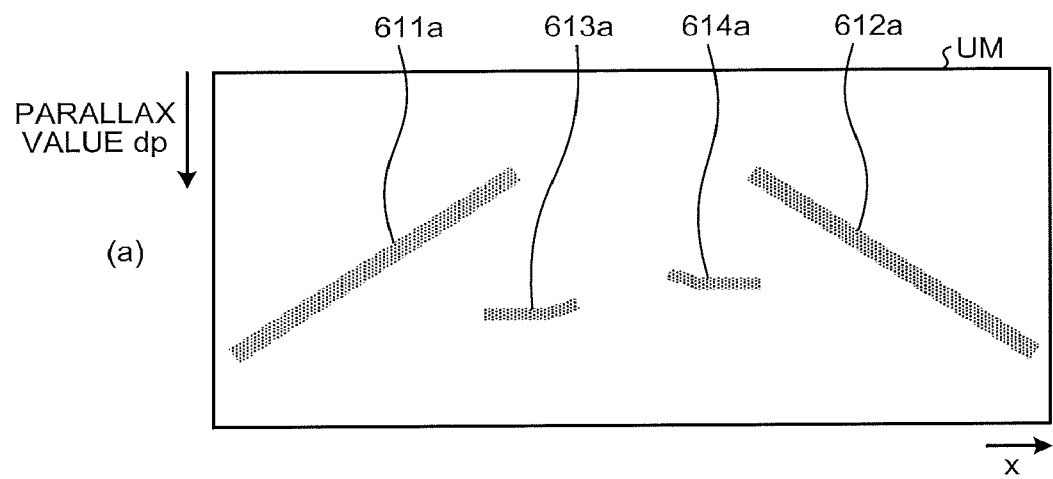
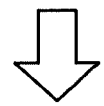
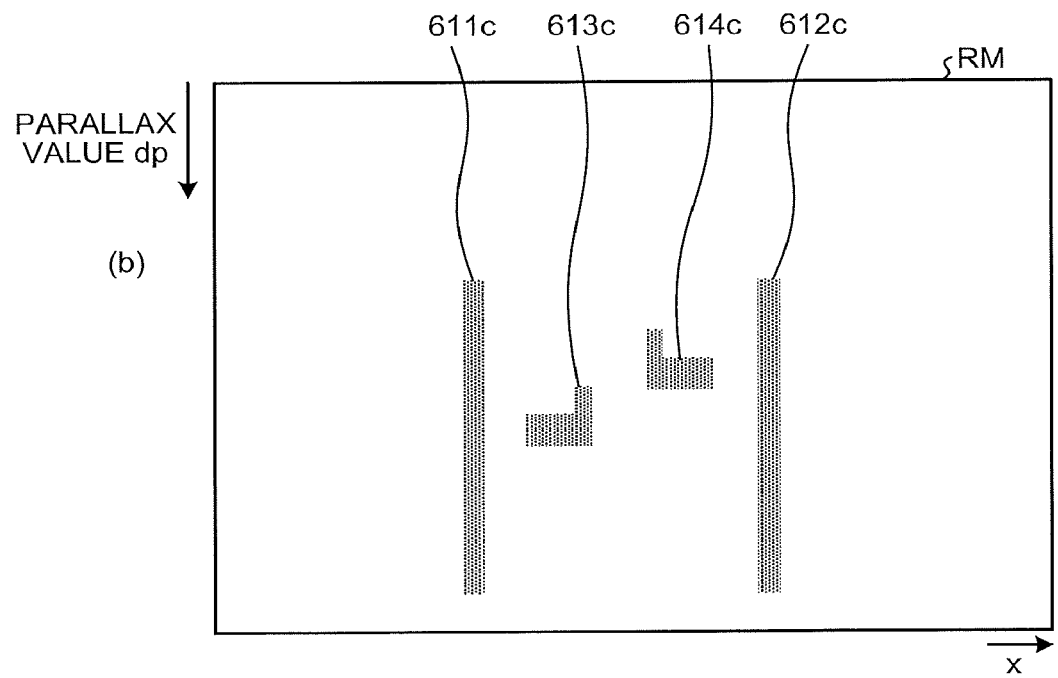

FIG.17A
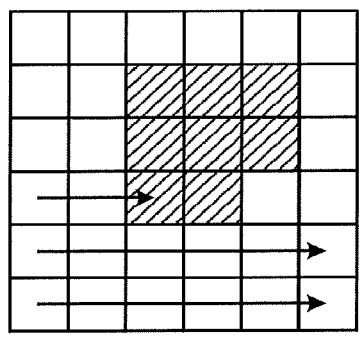
FIG.17D
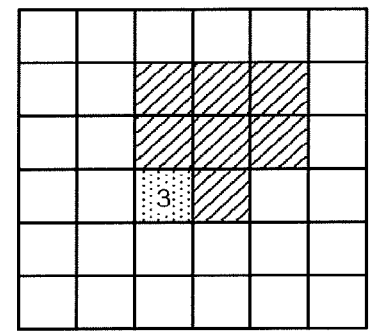
FIG.17B
| 6 | 5 | 4 |
|---|---|---|
| 7 |   | 3 |
| 0 | 1 | 2 |
PIXEL OF INTEREST
FIG.17E
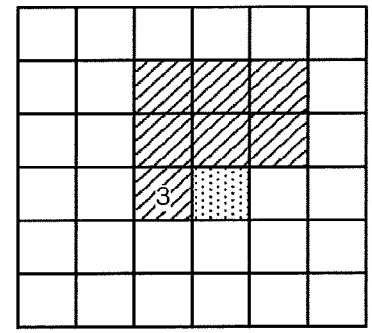
FIG.17C
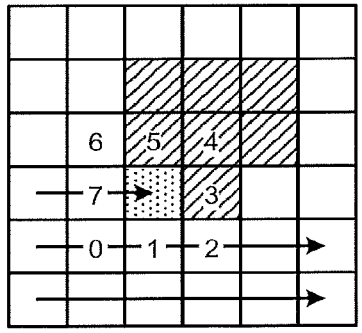
FIG.17F
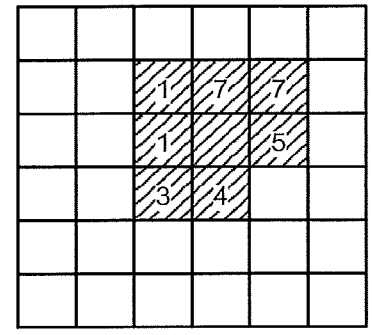

IMAGE PROCESSING DEVICE, OBJECT RECOGNIZING DEVICE, DEVICE CONTROL SYSTEM, IMAGE PROCESSING METHOD, AND COMPUTER-READABLE MEDIUM

CROSS-REFERENCE TO RELATED APPLICATIONS

The present application is a continuation application of International Application No. PCT/JP2016/086639, filed Dec. 8, 2016, which claims priority to Japanese Patent Application No. 2015-241450, filed Dec. 10, 2015. The contents of these applications are incorporated herein by reference in their entirety.

BACKGROUND OF THE INVENTION

1. Field of the Invention

The present invention is related to an image processing device, an object recognizing device, a device control system, an image processing method, and a computer readable medium.

2. Description of the Related Art

Conventionally, regarding the safety of automobiles, the development of automobile body structures has been carried out in such a way that, in case there is collision of a pedestrian and an automobile, the objective is to save the pedestrian and to protect the passengers. However, in recent years, with the progress in the information processing technology and the image processing technology, technologies for enabling detection of persons and automobiles at a faster pace have been developed. Using such technologies, automobiles have been developed that automatically apply brakes before colliding with an object thereby preventing the collision from occurring. Such automated control of automobiles requires accurate measurement of the distance to an object such as a person or another vehicle. For that purpose, distance measurement using millimeter-wave radar or laser radar as well as distance measurement using a stereo camera has been put to practical use.

In the case of using a stereo camera as the technology for recognizing objects, a parallax image is generated by deriving the parallax of each object appearing in a luminance image that is taken, and the pixels having nearly equal parallax values are grouped together so as to recognize the objects. At that time, the parallax mass of the parallax image is extracted, so that the heights of the objects, the widths of the objects, the depths of the objects, and the three-dimensional positions of the objects can be detected. Based on the size of an object recognized in such a manner, it becomes possible to decide on the type of that object (such as a vehicle, a guardrail, or a pedestrian). However, depending on the orientations of objects, the objects of the same type happen to have various sizes. Hence, the processing in the subsequent stages become difficult to carry out. For example, for an object having the size of a standard-sized vehicle, there can be times when the object is recognized to have the size of a big-sized vehicle depending on the orientation thereof. Hence, in the case of recognizing objects, not only the sizes of the objects need to be understood, but the orientations (particularly, the orientations of vehicles) also need to be understood. In order to understand the orientation, there is a method for detecting the faces of an object. When a vehicle represents the object to be recognized, the back face on the rear side and the lateral faces are detected. In order to recognize such an object and to detect the faces of the recognized object, a technology is known for using a U-Disparity map, in which distances (or parallax values) from a stereo camera represent the vertical axis, from a parallax image.

As a technology related to such a U-Disparity map, a technology for converting a parallax image into a pseudo parallax map is known (Japanese Patent Application Laid-open No. 2012-253666).

The technology disclosed in Japanese Patent Application Laid-open No. 2012-253666 is meant for converting a parallax image into a pseudo parallax map; and then the pseudo parallax map is used in a variety of image processing. However, regarding the image processing for recognizing an object (particularly a vehicle) as mentioned above and regarding the image processing for detecting the faces of that object, if only a single type of U-Disparity map is used, then it may take up unnecessary processing time depending on the objective of the image processing, and the targeted object may not be detectable in an appropriate manner.

SUMMARY OF THE INVENTION

According to one aspect of the present invention, an image processing device is configured to process a plurality of taken images imaged by a plurality of imaging units configured to take images in a travelling direction of a moving object. The image processing device includes a first generating unit, a second generating unit, a first extracting unit, a first processing unit, and a second processing unit. The first generating unit is configured to generate, based on a distance image generated from the plurality of taken images and made from distance values, a first image indicating a frequency distribution of the distance values corresponding to the travelling direction of the moving object, the frequency distribution associating actual distances in a direction orthogonal to the travelling direction with the distance values. The second generating unit is configured to generate, based on the distance image, a second image indicating a frequency distribution of the distance values corresponding to the travelling direction of the moving object, the frequency distribution associating a horizontal direction of the distance image with the distance values. The first extracting unit is configured to extract a first area representing an object, from the first image. The first processing unit is configured to perform first processing to detect a face of the object represented by the first area, using at least the first image. The second processing unit is configured to perform second processing to identify a type of the face of the object represented by the first area, using at least the second image.

BRIEF DESCRIPTION OF THE DRAWINGS

FIG. 1 is a diagram for explaining the principle behind deriving the distance from an imaging unit to an object;

FIG. 2 is an explanatory diagram for explaining a case of obtaining corresponding pixels in a comparison image which correspond to reference pixels in a reference image;

FIG. 12 is a diagram illustrating an example of a real U map generated from a U map;

FIGS. 17A to 17F are diagrams for explaining the details of the contour extraction processing performed with respect to the isolated areas;

The accompanying drawings are intended to depict exemplary embodiments of the present invention and should not be interpreted to limit the scope thereof. Identical or similar reference numerals designate identical or similar components throughout the various drawings.

DETAILED DESCRIPTION OF THE PREFERRED EMBODIMENTS

Figure 3:
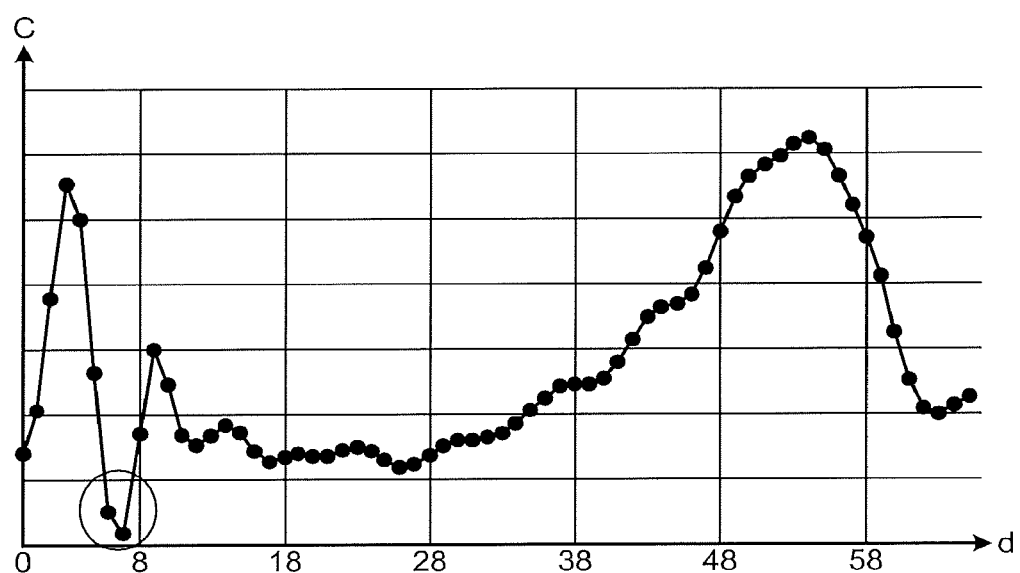
FIG. 3 is a diagram illustrating an exemplary graph of the result of block matching processing.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment has an object to provide an image processing device, an object recognizing device, a device control system, an image processing method, and a computer-readable medium that enable achieving enhancement in the accuracy and the processing speed of image processing by virtue of using different U-Disparity maps according to the objective of image processing.

[Overview of Distance Measurement Method Using Block Matching Processing]

Firstly, explained below with reference to FIGS. 1 to 3 is the overview of a distance measurement method implemented using block matching processing.

(Principle of Distance Measurement)

FIG. 1 is a diagram for explaining the principle behind deriving the distance from an imaging unit to an object. With reference to FIG. 1, the explanation is given about the principle by which the parallax with respect to an object is derived from a stereo camera according to stereo matching processing and the distance from the stereo camera to the object is measured using the parallax value indicating the parallax.

An imaging system illustrated in FIG. 1 includes imaging units 10a and 10b placed in a rectified manner. The imaging units 10a and 10b include imaging lenses 11a and 11b, respectively, for refracting the incident light and forming an image of the object on respective image sensors representing solid-state imaging devices. The images taken by the imaging units 10a and 10b are referred to as a reference image Ia (a first taken image) and a comparison image Ib (a second taken image), respectively. With reference to FIG. 1, a point S of an object E present in the three-dimensional space is mapped at such positions in the reference image Ia and the comparison image Ib which lie on a straight line parallel to the straight line joining the imaging lenses 11a and 11b. The point S that is mapped in the reference image Ia is referred to as a point Sa(x, y), and the point S that is mapped in the comparison image Ib is referred to as a point Sb(X, y). At that time, using the point Sa(x, y) present in the coordinates of the reference image Ia and the point Sb(X, y) present in the coordinates of the comparison image Ib, a parallax value dp is expressed as given below in (Equation 1).

$$dp = X - x \qquad \text{(Equation 1)}$$

Moreover, with reference to FIG. 1, if $\Delta a$ represents the distance between the point Sa(x, y) in the reference image Ia and the point of intersection of the perpendicular dropped from the imaging lens 11a onto the imaging area, and if $\Delta b$ represents the distance between the point Sb(X, y) in the comparison image Ib and the point of intersection of the perpendicular dropped from the imaging lens 11b onto the imaging area; then the parallax value dp can also be expressed as $dp = \Delta a + \Delta b$.

Subsequently, using the parallax value dp, a distance Z from the imaging units 10a and 10b to the object E is derived. The distance Z represents the distance from the straight line joining the focal positions of the imaging lenses 11a and 11b to the point S on the object E. As illustrated in FIG. 1, the distance Z can be calculated as given below in (Equation 2) using a focal length f of the imaging lenses 11a and 11b, a base length B representing the length between the imaging lenses 11a and 11b, and the parallax value dp.

$$Z=(B \times f)/dp \quad \text{(Equation 2)}$$

According to (Equation 2), it can be understood that, greater the parallax value dp, the shorter is the distance Z; and, smaller the parallax value dp, the longer is the distance Z.

(Block Matching Processing)

Explained below with reference to FIGS. 2 and 3 is a distance measurement method based on block matching processing.

FIG. 2 is an explanatory diagram for explaining a case of obtaining corresponding pixels in a comparison image which correspond to reference pixels in a reference image. FIG. 3 is a diagram illustrating an exemplary graph of the result of the block matching processing.

With reference to FIGS. 2 and 3, the explanation is given about a method of calculating a cost value C(p, d). In the following explanation, C(p, d) is assumed to express C(x, y, d).

In FIG. 2, a conceptual diagram indicating a reference pixel p and a reference area pb in the reference image Ia is illustrated at (a); and a conceptual diagram in the case of calculating the cost value C while sequentially shifting (moving) the candidate for corresponding pixel which is present in the comparison image Ib and which corresponds to the reference pixel p illustrated at (a) in FIG. 2 is illustrated at (b). Herein, a corresponding pixel represents such a pixel in the comparison image Ib which is the most similar to the reference pixel p in the reference image Ia. Moreover, the cost value C is an evaluation value (degree of coincidence) representing either the degree of similarity or the degree of dissimilarity of each pixel in the comparison image Ib. In the following explanation, it is assumed that, smaller the cost value C, the more it represents the evaluation value indicating the degree of dissimilarity between a pixel in the comparison image Ib and the reference pixel p.

As illustrated at (a) in FIG. 2, based on the luminance value (the pixel value) of the reference pixel p(x, y) in the reference image Ia and based on the luminance value (the pixel value) of a candidate pixel q(x+d, y) representing a candidate for corresponding pixel present on an epipolar line EL in the comparison image Ib with respect to the reference pixel p(x, y), the cost value C(p, d) is calculated for the candidate pixel q(x+d, y) that is a candidate for corresponding pixel with respect to the reference pixel p(x, y). Herein, d represents the amount of shift (the amount of movement) between the reference pixel p and the candidate pixel q, and the shift amount d is shifted in the unit of pixels. That is, while sequentially shifting the candidate pixel q(x+d, y) one pixel at a time in a pre-specified range (for example, 0<d<25), the cost value C(p, d) representing the degree of dissimilarity between the candidate pixel q(x+d, y) and the reference pixel p(x, y) is calculated. Meanwhile, as the stereo matching processing meant for obtaining the corresponding pixel of the reference pixel p, block matching (template matching) processing is performed in an embodiment. In the block matching processing, the degree of dissimilarity is obtained between the reference area pb, which represents a predetermined area centered around the reference pixel p in the reference image Ia, and a candidate area qb (having the same size as the reference area pb) centered around the candidate pixel q of the comparison image Ib. As the cost value C representing the degree of dissimilarity between the reference area pb and the candidate area qb; either the SAD (Sum of Absolute Difference) is used, or the SSD (Sum of Squared Difference) is used, or the ZSSD (Zero-mean-sum of Squared Difference) is used that is obtained by subtracting the average value of each block from the SSD value. Regarding such an evaluation value, higher the correlation (i.e., higher the degree of similarity), the smaller is the evaluation value thereby indicating the degree of dissimilarity.

Meanwhile, as described above, since the imaging units 10a and 10b are placed in a rectified manner, the reference image Ia and the comparison image Ib too are in the rectification relationship. Hence, corresponding to the reference pixel p in the reference image Ia, the corresponding pixel in the comparison image Ib happens to be present on the epipolar line EL illustrated as a horizontal line when viewed in FIG. 2. Thus, in order to obtain the corresponding pixel in the comparison image Ib, a search can be performed for such pixels of the comparison image Ib which are present on the epipolar line EL.

The cost value C(p, d) that is calculated in the block matching processing is expressed as, for example, the graph illustrated in FIG. 3 in relationship to the shift amount d. In the example illustrated in FIG. 3, the cost value C is the smallest when the shift amount d=7 holds true. Hence, the parallax value dp=7 is derived.

With reference to FIGS. 4 to 25, given below is the detailed explanation of the embodiment of an image processing device, an object recognizing device, a device control system, an image processing method, and a program according to the present invention. However, the present invention is not limited by the embodiment described below, and the constituent elements according to the embodiment are to be construed as embodying all modifications and alternative constructions that may occur to one skilled in the art that fairly fall within the basic teaching herein set forth.

EMBODIMENT

With reference to FIGS. 4 to 25, given below is the specific explanation of the embodiment. Herein, the explanation is given for a case in which an object recognizing device 1, which performs the block matching processing, is installed in an automobile.

(Overall Configuration of Vehicle Including Object Recognizing Device)

Figure 4A:
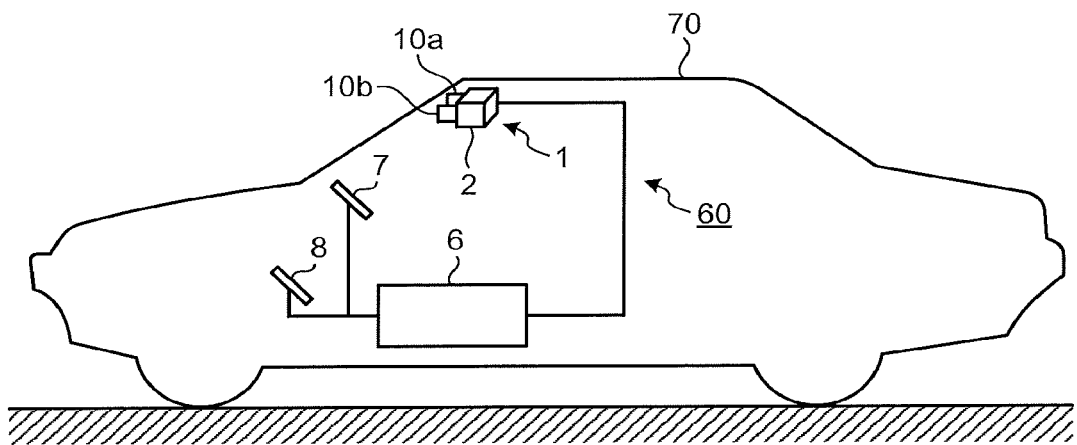
FIGS. 4A and 4B are diagrams illustrating an example in which a device control system according to an embodiment is installed in a vehicle.
Figure 4B:
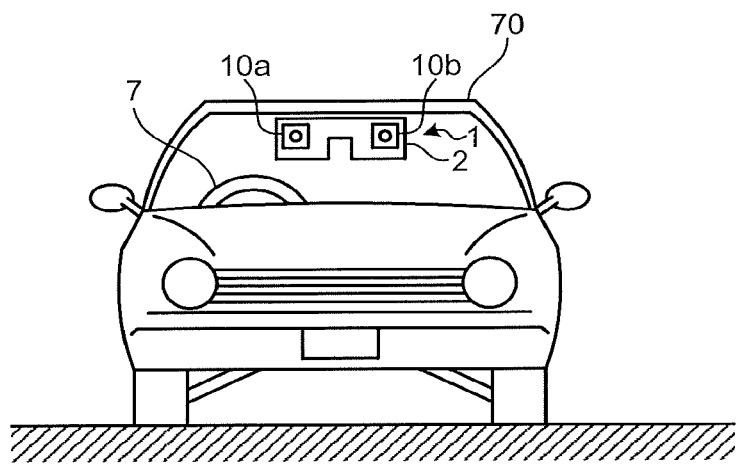

FIGS. 4A and 4B are diagrams illustrating an example in which the device control system according to the embodiment is installed in a vehicle. With reference to FIGS. 4A and 4B, the explanation is given about a vehicle 70 in which a device control system 60 according to the embodiment is installed. FIG. 4A is a lateral view of the vehicle 70 in which the device control system 60 is installed, and FIG. 4B is a front view of the vehicle 70.

As illustrated in FIGS. 4A and 4B, the vehicle 70 representing an automobile has the device control system 60 installed therein. The device control system 60 includes the object recognizing device 1, a vehicle control device 6 (a control device), a steering wheel 7, and a brake pedal 8 that are installed in the vehicle interior representing the cabin space of the vehicle 70.

The object recognizing device 1 has an imaging function for taking images in the travelling direction of the vehicle 70 and is installed, for example, on the inside of the front window of the vehicle 70 and near the rearview mirror. Although the configuration and the operations thereof are described later in detail, the object recognizing device 1 includes a main body 2 and includes the imaging units 10a and 10b that are fixed to the main body 2. Herein, the imaging units 10a and 10b are fixed to the main body 2 in such a way that photographing subjects present in the travelling direction of the vehicle 70 are captured in images.

The vehicle control device 6 is an ECU (Electronic Control Unit) that performs a variety of vehicle control based on recognition information received from the object recognizing device 1. As an example of the vehicle control; based on the recognition information received from the object recognizing device 1, the vehicle control device 6 performs steering control in which the steering system (the target for control) including the steering wheel 7 is controlled to avoid obstacles, and performs braking control in which the brake pedal 8 (the target for control) is controlled to make the vehicle 70 decelerate and stop.

Thus, in the device control system 60 that includes the object recognizing device 1 and the vehicle control device 6, by performing the vehicle control such as the steering control and the braking control, the driving safety of the vehicle 70 can be enhanced.

Meanwhile, as described above, the object recognizing device 1 takes images of the front side of the vehicle 70. However, that is not the only possible case. Alternatively, the object recognizing device 1 can be installed to take images of the rear side or the lateral sides of the vehicle 70. In that case, the object recognizing device 1 can detect trailing vehicles and persons present on the rear side of the vehicle 70 or can detect other vehicles and persons present on the lateral sides of the vehicle 70. Then, the vehicle control device 6 can detect risks at the time of lane changing or lane merging of the vehicle 70, and can perform the vehicle control as described above. Moreover, at the time of reversing the vehicle 70 for the parking purpose, if a risk of collision is determined to be present based on the recognition information about the obstacles on the rear side of the vehicle 70 as output by the object recognizing device 1, then the vehicle control device 6 can perform the vehicle control as described above.

(Configuration of Object Recognizing Device)

Figure 5:
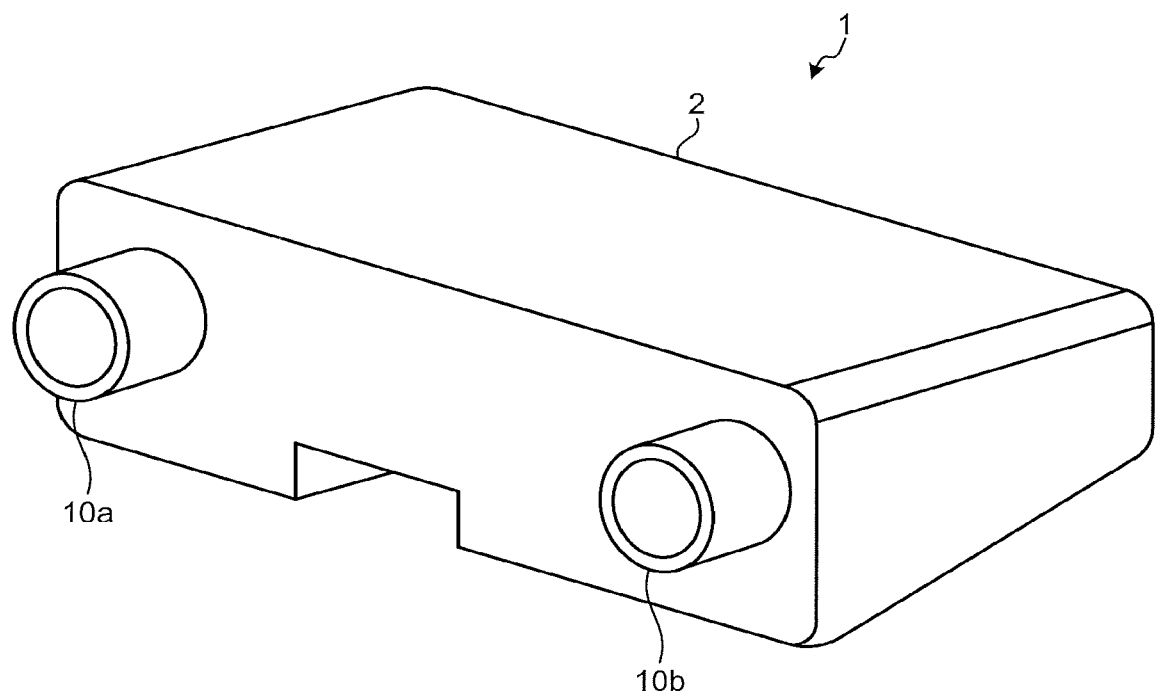
FIG. 5 is a diagram illustrating an exemplary external appearance of an object recognizing device according to the embodiment.

FIG. 5 is a diagram illustrating an exemplary external appearance of the object recognizing device according to the embodiment. As illustrated in FIG. 5, the object recognizing device 1 includes the main body 2 and includes the imaging units 10a and 10b fixed to the main body 2 as described above. The imaging units 10a and 10b are configured with a pair of cylindrical cameras that are placed in a rectified manner with respect to the main body 2. Herein, for the purpose of illustration, with reference to FIG. 5, the imaging unit 10a is sometimes referred to as the "right-side camera", and the imaging unit 10b is sometimes referred to as the "left-side camera".

<Hardware Configuration of Object Recognizing Device>

Figure 6:
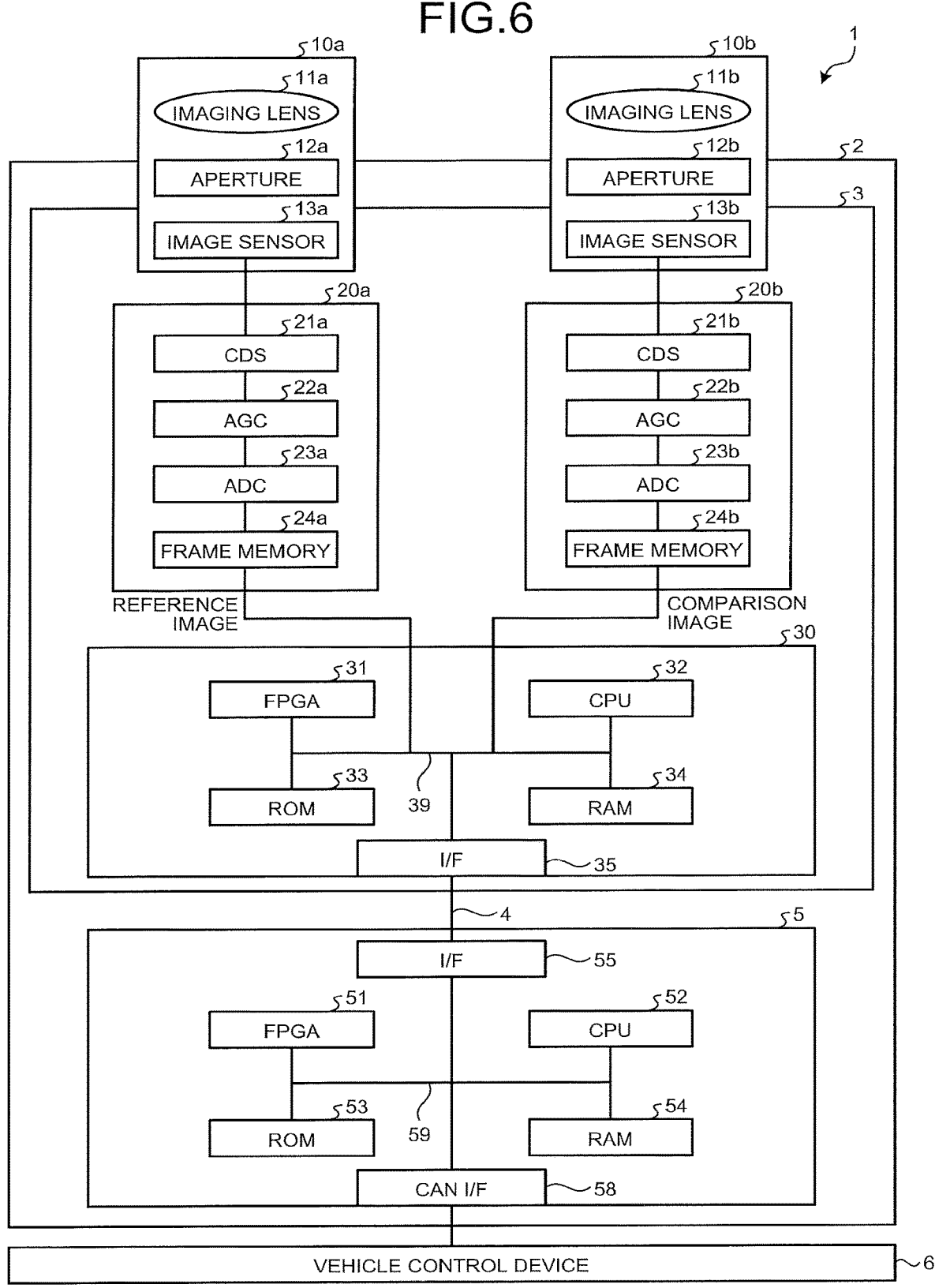
FIG. 6 is a diagram illustrating an exemplary hardware configuration of the object recognizing device according to the embodiment.

FIG. 6 is a diagram illustrating an exemplary hardware configuration of the object recognizing device according to the embodiment. Thus, explained with reference to FIG. 6 is a hardware configuration of the object recognizing device 1.

As illustrated in FIG. 6, the object recognizing device 1 includes a parallax value deriving unit 3 and a recognizing unit 5 inside the main body 2.

The parallax value deriving unit 3 derives, from a plurality of taken images in which the object E is captured, the parallax value dp (an example of a distance value) representing the parallax with respect to the object E; and outputs a parallax image having the parallax value dp as the pixel value of each pixel. Based on the parallax image output by the parallax value deriving unit 3, the recognizing unit 5 performs object recognition processing with respect to the objects such as persons and vehicles captured in the taken images; and outputs recognition information, which represents the result of the object recognition processing, to the vehicle control device 6.

As illustrated in FIG. 6, the parallax value deriving unit 3 includes the imaging units 10a and 10b, signal converting units 20a and 20b, and an image processing unit 30.

The imaging unit 10a is a processing unit for taking images of anterior photographic subjects and generating analog image signals. The imaging unit 10a includes an imaging lens 11a, an aperture 12a, and an image sensor 13a.

The imaging lens 11a is an optical element for refracting the incident light and forming an image of an object on the image sensor 13a. The aperture 12a is a member that blocks some of the light which has passed through the imaging lens 11a, and thus adjusts the amount of light input to the image sensor 13a. The image sensor 13a is a semiconductor element that converts the light, which had fallen on the imaging lens 11a and passed through the aperture 12a, into an electrical and analog image signal. The image sensor 13a is implemented using, for example, a solid-state image sensing device such as a CCD (Charge Coupled Device) or a CMOS (Complementary Metal Oxide Semiconductor).

The imaging unit 10b is a processing unit for taking images of anterior photographic subjects and generating analog image signals. The imaging unit 10b includes an imaging lens 11b, an aperture 12b, and an image sensor 13b. Herein, the imaging lens 11b, the aperture 12b, and the image sensor 13b have identical functions to the functions of the imaging lens 11a, the aperture 12a, and the image sensor 13a, respectively, described above. Meanwhile, the imaging lenses 11a and 11b are installed to have their principal faces in the substantially same plane so as to ensure that the right-side camera and the left-side camera take images under the same conditions.

The signal converting unit 20a is a processing unit for converting the analog image signal, which is generated by the imaging unit 10a, into digital image data. The signal converting unit 20a includes CDS (Correlated Double Sampling) 21a, an AGC (Auto Gain Control) 22a, an ADC (Analog Digital Converter) 23a, and a frame memory 24a.

The CDS 21a removes noise from the analog image signal, which is generated by the image sensor 13a, using correlation double sampling, a lateral differential filter, and a vertical smoothing filter. The AGC 22a performs gain control for controlling the intensity of the analog image signal from which noise has been removed by the CDS 21a. The ADC 23a converts the analog image signal, which has been subjected to gain control by the AGC 22a, into digital image data. The frame memory 24a is used to store the image data which is obtained by conversion by the ADC 23a.

The signal converting unit 20b is a processing unit for converting the analog image signal, which is generated by the imaging unit 10b, into digital image data. The signal processing unit 20b includes CDS 21b, an AGC 22b, an ADC 23b, and a frame memory 24b. Herein, the CDS 21b, the AGC 22b, the ADC 23b, and the frame memory 24b having identical functions to the functions of the CDS 21a, the AGC 22a, the ADC 23a, and the frame memory 24a, respectively, described above.

The image processing unit 30 is a device that performs image processing with respect to the image data which has been obtained by conversion by the signal converting units 20a and 20b. The image processing unit 30 includes an FPGA (Field Programmable Gate Array) 31, a CPU (Central Processing Unit) 32, a ROM (Read Only Memory) 33, a RAM (Random Access Memory) 34, an I/F (Interface) 35, and a bus line 39.

The FPGA 31 is an integrated circuit and herein performs processing of deriving the parallax value dp in an image that is formed based on the image data. The CPU 32 controls the various functions of the parallax value deriving unit 3. The ROM 33 is used to store an image processing program that is executed by the CPU 32 for controlling the various functions of the parallax value deriving unit 3. The RAM 34 is used as the work area for the CPU 32. The I/F 35 is an interface for performing communication with an I/F 55 of the recognizing unit 5 via a communication line 4. As illustrated in FIG. 6, the bus line 39 represents an address bus and a data bus that communicably connect the FPGA 31, the CPU 32, the ROM 33, the RAM 34, and the I/F 35 to each other.

Meanwhile, although the image processing unit 30 includes the FPGA 31 as an integrated circuit for deriving the parallax value dp, that is not the only possible case. Alternatively, some other integrated circuit such as an ASIC (Application Specific Integrated Circuit) can be used.

As illustrated in FIG. 6, the recognizing unit 5 includes an FPGA 51, a CPU 52, a ROM 53, a RAM 54, the I/F 55, a CAN (Controller Area Network) I/F 58, and a bus line 59.

The FPGA 51 is an integrated circuit and herein, based on the parallax image received from the image processing unit 30, performs object recognition processing with respect to the objects. The CPU 52 controls the various functions of the recognizing unit 5. The ROM 53 is used to store an object recognition program that is executed by the CPU 52 so that the object recognition processing is performed in the recognizing unit 5. The RAM 54 is used as the work area for the CPU 52. The I/F 55 is an interface for performing data communication with the I/F 35 of the image processing unit 30 via the communication line 4. The CAN I/F 58 is an interface for performing communication with an external controller (such as the vehicle control device 6 illustrated in FIG. 6). As illustrated in FIG. 6, the bus line 59 that is connected to the CAN of the automobile represents, for example, an address bus and a data bus that communicably connect the FPGA 51, the CPU 52, the ROM 53, the RAM 54, the I/F 55, and the CAN I/F 58 to each other.

As a result of such a configuration, when a parallax image is sent from the I/F 35 of the image processing unit 30 to the recognizing unit 5 via the communication line 4, the FPGA 51 follows a command from the CPU 52 of the recognizing unit 5 and, based on the parallax image, performs object recognition processing with respect to the objects such as persons and vehicles captured in the taken images.

Meanwhile, the programs mentioned above can be distributed by recording them as installable or executable files in a computer-readable recording medium. Examples of the recording medium include a CD-ROM (Compact Disk Read Only Memory) and an SD (Secure Digital) memory card.

<Configuration and Operations of Functional Blocks of Object Recognizing Device>

Figure 7:
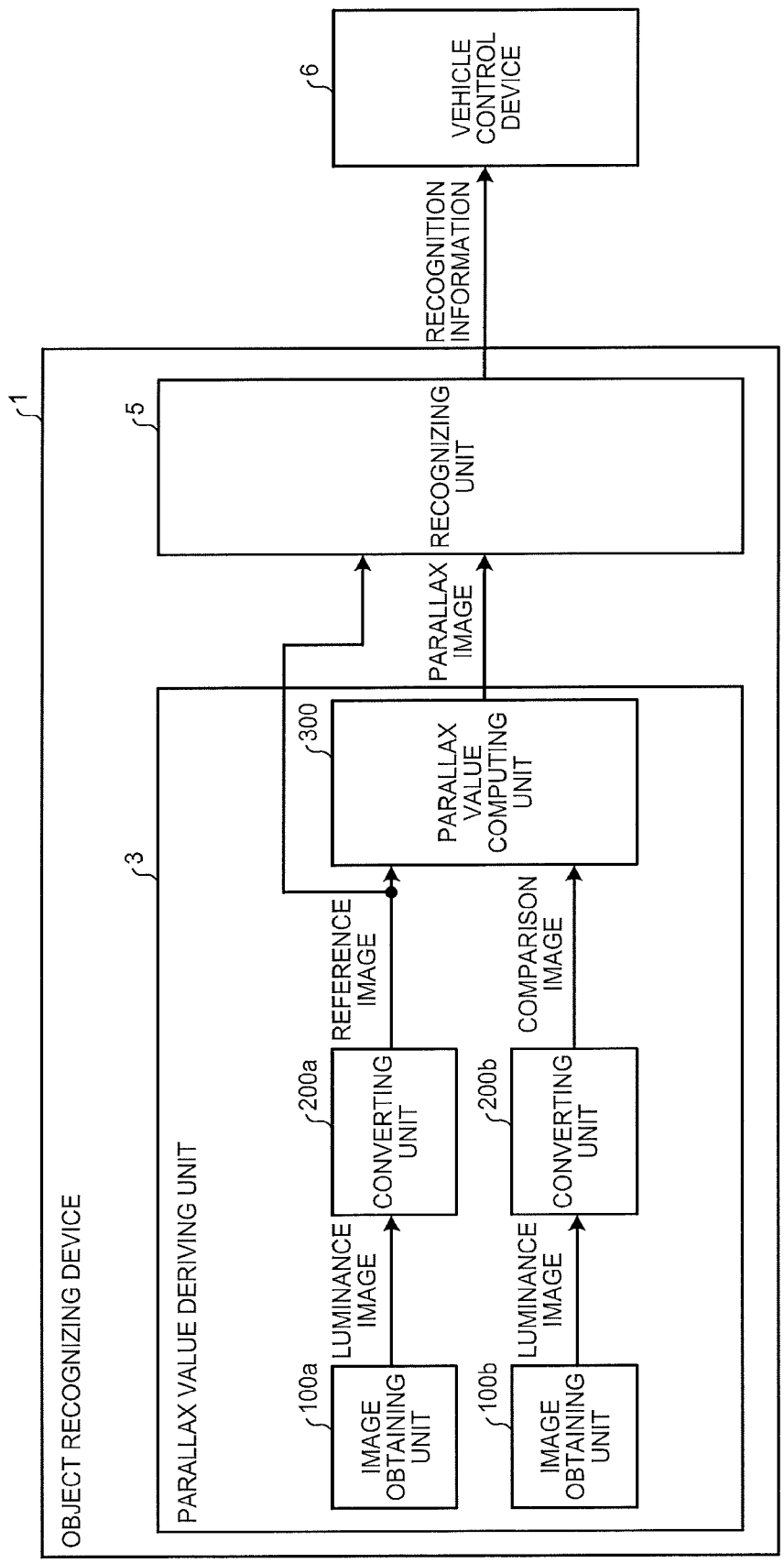
FIG. 7 is a diagram illustrating an exemplary functional block configuration of the object recognizing device according to the embodiment.

FIG. 7 is a diagram illustrating an exemplary functional block configuration of the object recognizing device according to the embodiment. Firstly, explained with reference to FIG. 7 is the configuration and the operations of the main part of the object recognizing device 1.

As described earlier with reference to FIG. 6 too, the object recognizing device 1 includes the parallax value deriving unit 3 and the recognizing unit 5 as illustrated in FIG. 7. The parallax value deriving unit 3 includes an image obtaining unit 100a (a first imaging unit), an image obtaining unit 100b (a second imaging unit), converting units 200a and 200b, and a parallax value computing unit 300.

The image obtaining unit 100a is a functional unit that takes an image of an anterior photographic subject using the right-side camera; generates an analog image signal; and obtains a luminance image representing an image based on the image signal. The image obtaining unit 100a is implemented using the imaging unit 10a illustrated in FIG. 6.

The image obtaining unit 100b is a functional unit that takes an image of an anterior photographic subject using the left-side camera; generates an analog image signal; and obtains a luminance image representing an image based on the image signal. The image obtaining unit 100b is implemented using the imaging unit 10b illustrated in FIG. 6.

The converting unit 200a is a functional unit that removes noise from the image data of the luminance image obtained by the image obtaining unit 100a; converts the image data into digital image data; and outputs the digital image data. The converting unit 200a is implemented using the signal converting unit 20a illustrated in FIG. 6.

The converting unit 200b is a functional unit that removes noise from the image data of the luminance image obtained by the image obtaining unit 100b; converts the image data into digital image data; and outputs the digital image data. The converting unit 200b is implemented using the signal converting unit 20b illustrated in FIG. 6.

Of the image data of two luminance images (hereinafter, simply referred to as luminance images) output by the converting units 200a and 200b, the luminance image taken by the image obtaining unit 100a representing the right-side camera (the imaging unit 10a) is assumed to be the image data of the reference image Ia (hereinafter, simply referred to as the reference image Ia) (a first taken image); and the luminance image taken by the image obtaining unit 100b representing the left-side camera (the imaging unit 10b) is assumed to be the image data of the comparison image Ib (hereinafter, simply referred to as the comparison image Ib) (a second taken image). That is, based on the two luminance images output by the image obtaining units 100a and 100b, the converting units 200a and 200b output the reference image Ia and the comparison image Ib, respectively.

Figure 8:
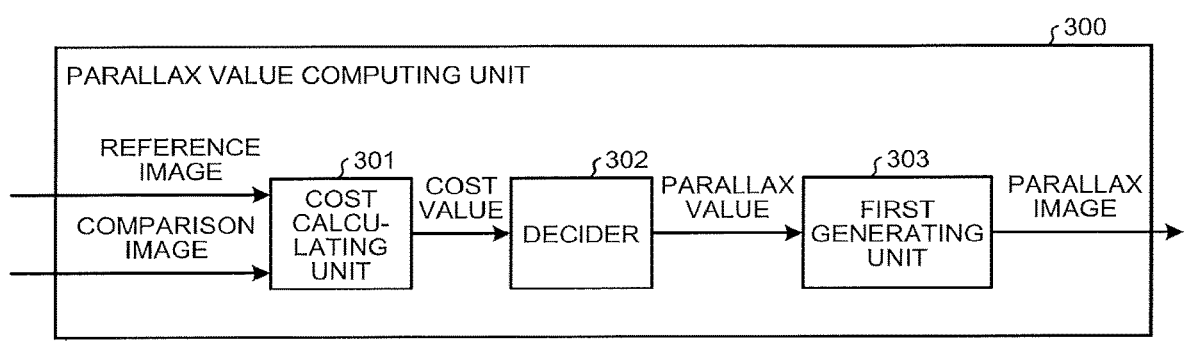
FIG. 8 is a diagram illustrating an exemplary functional block configuration of a parallax value computing unit of the object recognizing device according to the embodiment.

FIG. 8 is a diagram illustrating an exemplary functional block configuration of the parallax value computing unit of the object recognizing device according to the embodiment. Thus, explained with reference to FIG. 8 is a configuration and operations of the functional blocks of the parallax value computing unit 300.

The parallax value computing unit 300 is a functional unit that, based on the reference image Ia and the comparison image Ib received from the converting units 200a and 200b, respectively, derives the parallax value for each pixel of the reference image Ia; and generates a parallax image in which a parallax value is associated to each pixel of the reference image Ia. Then, the parallax value computing unit 300 outputs the generated parallax image to the recognizing unit 5. As illustrated in FIG. 8, the parallax value computing unit 300 includes a cost calculating unit 301, a decider 302, and a first generating unit 303 (a third generating unit).

The cost calculating unit 301 is a functional unit that, based on the luminance value of the reference pixel p(x, y) in the reference image Ia and based on the luminance value of each candidate pixel q(x+d, y) that represents a candidate for corresponding pixel identified by shifting the pixels by the shift amount d from the pixel corresponding to the position of the reference pixel p(x, y) on the epipolar line EL in the comparison image Ib on the basis of the reference pixel p(x, y), calculates the cost value C(p, d) of that candidate pixel q(x+d, y). More particularly, the cost calculating unit 301 performs the block matching processing and calculates, as the cost value C, the degree of dissimilarity between the reference area pb, which represents a predetermined area centered around the reference pixel p in the reference image Ia, and the candidate area qb (having the same size as the reference area pb), which is centered around the candidate pixel q of the comparison image Ib.

The decider 302 is a functional unit that decides that the shift amount d corresponding to the smallest of the cost values C, which are calculated by the cost calculating unit 301, represents the parallax value dp for such pixels in the reference image Ia for which the cost value C was calculated.

The first generating unit 303 is a functional unit that, based on the parallax values dp determined by the decider 302, generates a parallax image in which the pixel value of each pixel in the reference image Ia is substituted with the parallax value dp corresponding to that pixel.

Meanwhile, the cost calculating unit 301, the decider 302, and the first generating unit 303 illustrated in FIG. 8 are implemented using the FPGA 31 illustrated in FIG. 6. Alternatively, instead of using the FPGA 31 that is a hardware circuit, some or all of the cost calculating unit 301, the decider 302, and the first generating unit 303 can be implemented as a result of execution of programs, which are stored in the ROM 33, by the CPU 32.

Moreover, the cost calculating unit 301, the decider 302, and the first generating unit 303 of the parallax value computing unit 300 illustrated in FIG. 8 are meant to illustrate the functions in a conceptual manner, and the configuration is not limited to the configuration illustrated in FIG. 8. Alternatively, for example, the functional units that are illustrated as independent functional units in the parallax value computing unit 300 in FIG. 8 can be configured as a single functional unit. In contrast, the functions of a single functional unit in the parallax value computing unit 300 illustrated in FIG. 8 can be divided into a plurality of functions, and thus the functional unit can be configured as a plurality of functional units.

Figure 9:
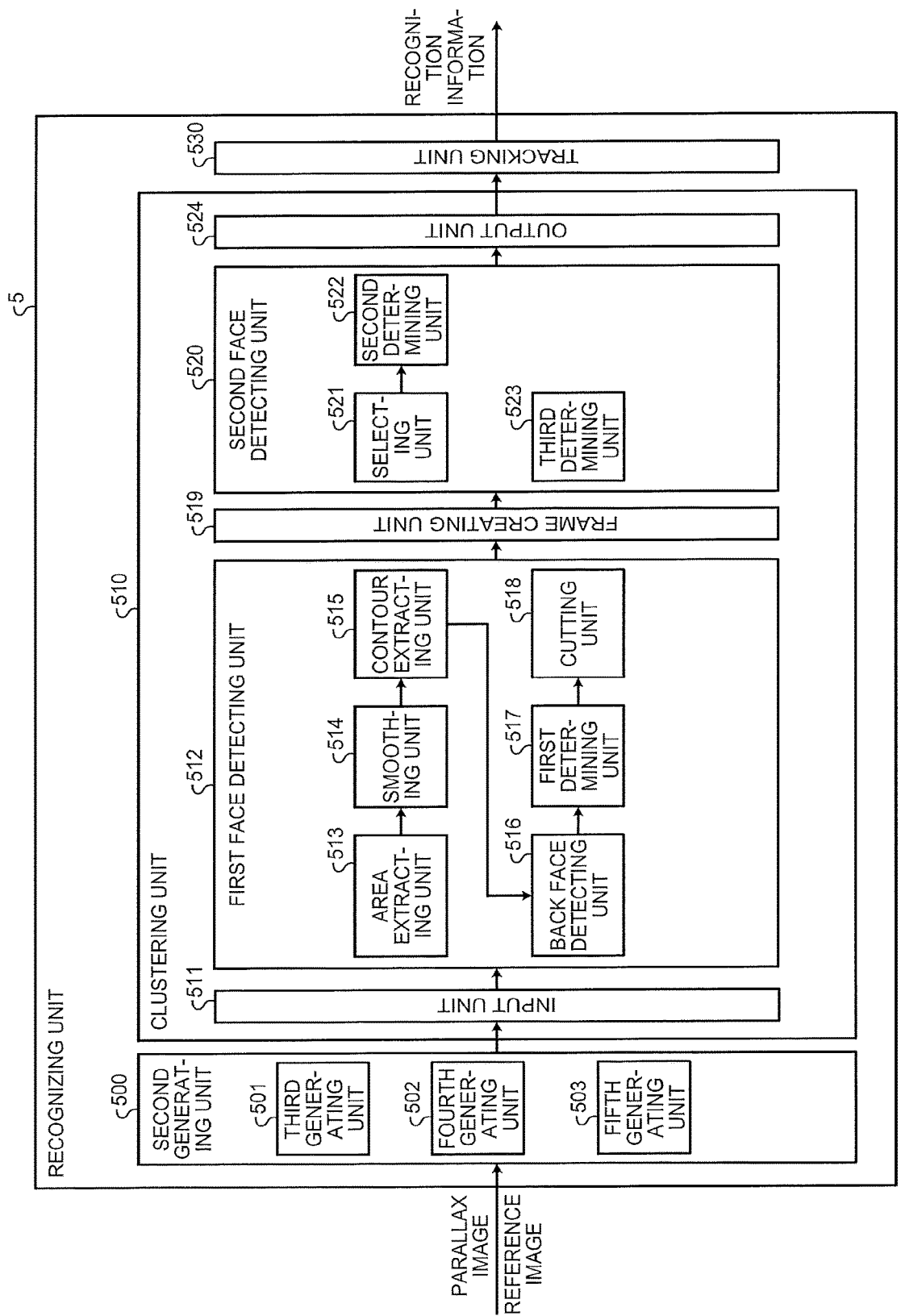
FIG. 9 is a diagram illustrating an exemplary functional block configuration of a recognizing unit of the object recognizing device according to the embodiment.

FIG. 9 is a diagram illustrating an exemplary functional block configuration of the recognizing unit of the object recognizing device according to the embodiment. Thus, explained below with reference to FIG. 9 is a configuration and operations of the functional blocks of the recognizing unit 5.

As illustrated in FIG. 9, the recognizing unit 5 includes a second generating unit 500, a clustering unit 510, and a tracking unit 530.

The second generating unit 500 is a functional unit that receives a parallax image from the parallax value computing unit 300; receives the reference image Ia from the parallax value deriving unit 3; and generates a V-Disparity map, a U-disparity map, and a Real U-Disparity map. Regarding the details of each map, the explanation is given later. Moreover, regarding a specific configuration and operations of the second generating unit 500, the explanation is given later. Meanwhile, the image input from the parallax value deriving unit 3 is not limited to the reference image Ia, and alternatively the comparison image Ib can be treated as the target image.

The clustering unit 510 is a functional unit that, based on the maps input from the second generating unit 500, recognizes the objects appearing in the parallax image, and detects the faces of each object (particularly a vehicle). As illustrated in FIG. 9, the clustering unit 510 includes an input unit 511, a first face detecting unit 512, a frame creating unit 519, a second face detecting unit 520 (a second processing unit), and an output unit 524. Regarding the specific operations of the clustering unit 510, the explanation is given later.

The tracking unit 530 is a functional unit that, based on recognition area information that represents the information related to each object recognized by the clustering unit 510, performs tracking processing for rejecting that object or tracking that object. Herein, rejection implies excluding the concerned object from the subsequent processing (such as tracking). The recognition area information represents the information related to an object recognized by the clustering unit 510 and contains the following: the position and size of the recognized object in the V-Disparity map, in the U-Disparity map, and in the Real U-Disparity map; an identification number in a labelling processing (described later); and information about a rejection flag. For example, the tracking unit 530 specifies the result of rejection (a rejection flag) of an object, which is recognized by the clustering unit 510, in the recognition area information.

Meanwhile, the "image processing device" according to the present invention either can imply the clustering unit 510 or can imply the recognizing unit 5 that includes the clustering unit 510.

Figure 10:
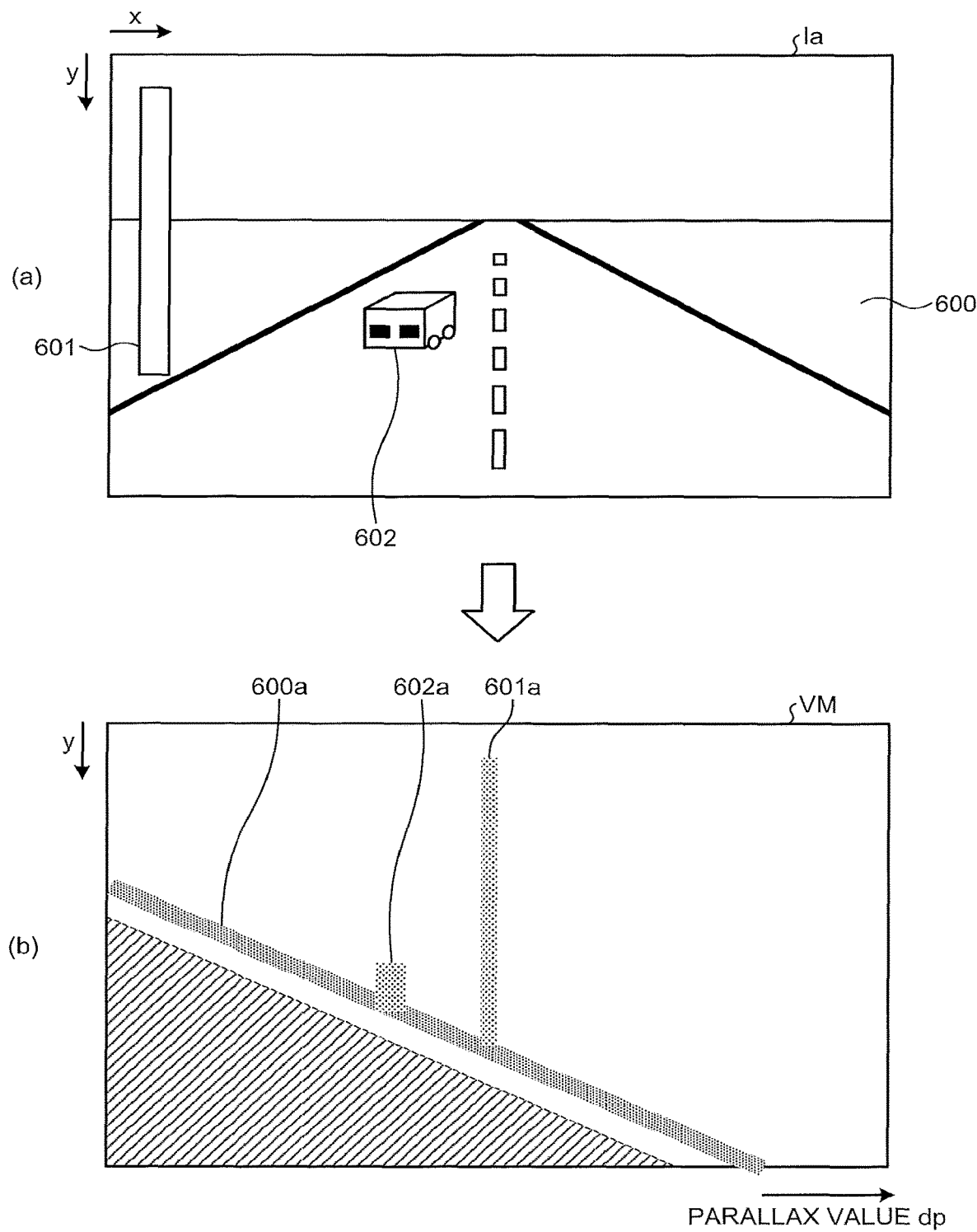
FIG. 10 is a diagram illustrating an example of a V map generated from a parallax image.
Figure 11:
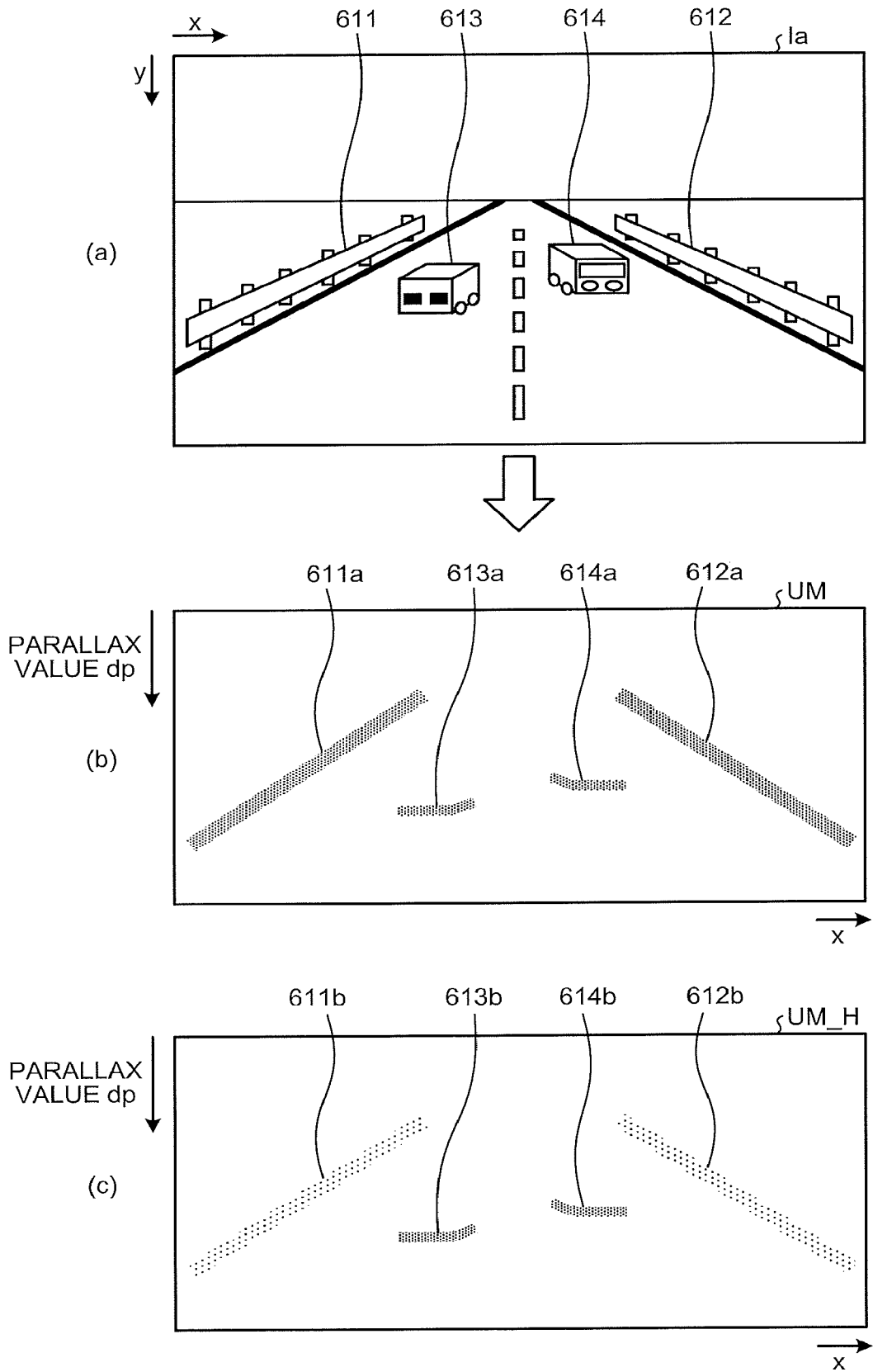
FIG. 11 is a diagram illustrating an example of a U map generated from a parallax image.

FIG. 10 is a diagram illustrating an example of a V map generated from a parallax image. FIG. 11 is a diagram illustrating an example of a U map generated from a parallax image. FIG. 12 is a diagram illustrating an example of a real U map generated from a U map. Explained below with reference to FIGS. 9 to 12 is a configuration and operations of the second generating unit 500 of the recognizing unit 5.

As illustrated in FIG. 9, the second generating unit 500 includes a third generating unit 501, a fourth generating unit 502 (a second generating unit), and a fifth generating unit 503 (a first generating unit).

The third generating unit 501 is a functional unit that generates a V map VM, which is a V-Disparity map illustrated at (b) in FIG. 10, for enabling detection of the road surface from the parallax image input from the parallax value computing unit 300. Herein, a V-Disparity map is a two-dimensional histogram in which the y-axis of the reference image Ia represents the vertical axis and the parallax values dp (or the distances) of the parallax image represent the horizontal axis, and which indicates the frequency distribution of the parallax values dp. In the reference image Ia illustrated at (a) in FIG. 10, for example, a road surface 600, a utility pole 601, and a vehicle 602 are captured. The road surface 600 captured in the reference image Ia corresponds to a road surface portion 600a in the V map VM. Similarly, the utility pole 601 corresponds to a utility pole portion 601a, and the vehicle 602 corresponds to a vehicle portion 602a.

The third generating unit 501 refers to the generated V map VM and performs linear approximation with respect to the positions estimated to be of the road surface. If the road surface is flat in nature, then approximation is possible with a single straight line. However, in the case of a road surface having varying road gradients, it becomes necessary to divide the V map VM into sections and then perform linear approximation with accuracy. Herein, the linear approximation can be performed using a known technology such as the Hough transformation or the least-square method. In the V map VM, the utility pole portion 601a and the vehicle portion 602a that represent masses present on the upper side of the detected road surface portion 600a correspond to the utility pole 601 and the vehicle 602 representing the objects on the road surface 600. When a U-Disparity map is generated by the fourth generating unit 502 (described below), the information about only the portion on the upper side of the road surface is used for noise removal.

The fourth generating unit 502 is a functional unit that refers to the information positioned only on the upper side of the detected road surface in the V map VM, that is, refers to such information in the parallax image which corresponds to a left-side guardrail 611, a right-side guardrail 612, and vehicles 613 and 614 in the reference image Ia illustrated at (a) in FIG. 11; and generates a U map UM (a second frequency image) that represents a U-Disparity map illustrated at (b) in FIG. 11 and that is to be used in object recognition. The U map UM is a two-dimensional histogram in which the x-axis of the reference image Ia represents the horizontal axis and the parallax values dp (or the distances) of the parallax image represent the vertical axis, and which indicates the frequency distribution of the parallax values dp. The left-side guardrail 611 in the reference image Ia illustrated at (a) in FIG. 11 corresponds to a left-side guardrail portion 611a in the U map UM. Similarly, the right-side guardrail 612 corresponds to a right-side guardrail portion 612a, the vehicle 613 corresponds to a vehicle portion 613a, and the vehicle 614 corresponds to a vehicle portion 614a.

Moreover, the fourth generating unit 502 refers to the information positioned only on the upper side of the detected road surface in the V map VM, that is, refers to such information in the parallax image which corresponds to the left-side guardrail 611, the right-side guardrail 612, and the vehicles 613 and 614 in the reference image Ia illustrated at (a) in FIG. 11; and generates a U map UM_H that represents an example of the U-Disparity map as illustrated at (c) in FIG. 11. Herein, the U map UM_H that represents an example of the U-Disparity map is an image in which the x-axis of the reference image Ia represents the horizontal axis, the parallax values dp of the parallax image represent the vertical axis, and the pixel values represent the heights of the objects. The left-side guardrail 611 in the reference image Ia illustrated at (a) in FIG. 11 corresponds to a left-side guardrail portion 611b in the U map UM_H. Similarly, the right-side guardrail 612 corresponds to a right-side guardrail portion 612b, the vehicle 613 corresponds to a vehicle portion 613b, and the vehicle 614 corresponds to a vehicle portion 614b.

The fifth generating unit 503 is a functional unit that, from the U map UM generated by the fourth generating unit 502 and illustrated at (a) in FIG. 12, a real U map RM (a first image) that represents a Real U-Disparity map in which the horizontal axis is converted into the actual distance as illustrated at (b) in FIG. 12. Herein, the real U map RM is a two-dimensional histogram in which the actual distance in the direction from the imaging unit 10b (the left-side camera) toward the imaging unit 10a (the right-side camera) represents the horizontal axis, and the parallax value dp of the parallax image (or the distance in the depth direction converted from the parallax value dp) represents the vertical axis. The left-side guardrail portion 611a in the U map UM illustrated at (a) in FIG. 12 corresponds to a left-side guardrail portion 611c in the real U map RM. Similarly, the right-side guardrail portion 612a corresponds to a right-side guardrail portion 612c, the vehicle portion 613a corresponds to a vehicle portion 613c, and the vehicle portion 614a corresponds to a vehicle portion 614c.

More particularly, in the U map UM, farther the distance (smaller the parallax value dp), the smaller is the object. Hence, less parallax information is available, and the distance resolution is also small. Thus, the fifth generating unit 503 does not perform thinning out. In the case of shorter distances, since the object appears larger, there is more information about the parallax values, and the distance resolution is also large. Thus, the fifth generating unit 503 substantially thins out the pixels. With that, the fifth generating unit 503 generates the real U map RM that is equivalent to an overhead view. As described later, from the real U map RM, masses of pixel values (objects) ("isolated areas" described later) can be extracted. In that case, the width of the rectangle enclosing a mass is equivalent to the width of the extracted object, and the height is equivalent to the depth of the extracted object. Meanwhile, the fifth generating unit 503 is not limited to generating the real U map RM from the U map UM, and can also be configured to generate the real U map RM directly from the parallax image.

From the generated U map UM or from the generated real U map RM, the second generating unit 500 can identify the position in the x-axis direction and the width (xmin, xmax) of an object in the parallax image and the reference image Ia. Moreover, from height information (dmin, dmax) of an object in the generated U map UM or the generated real U map RM, the second generating unit 500 can identify the actual depth of that object. Furthermore, from the generated V map VM, the second generating unit 500 can identify the position in the y-axis direction and the height (ymin="y-coordinate equivalent to the maximum height from the road surface having the maximum parallax value", ymax="y-coordinate indicating the height of the road surface as obtained from the maximum parallax value") of the object in the parallax image and the reference image Ia. Moreover, from the width (xmin, xmax) in the x-axis direction, the height (ymin, ymax) in the y-axis direction, and the parallax values dp corresponding to the width and the height of the object identified in the parallax image; the second generating unit 500 can identify the actual size of the object in the x-axis direction and the y-axis direction. In this way, the second generating unit 500 can refer to the V map VM, the U map UM, and the real U map RM; and can identify the position, the actual width, the actual height, and the actual depth of the object in the reference image Ia. Moreover, since the position of the object in the reference image Ia is identified, the position of the object in the parallax image also gets decided; and the second generating unit 500 can also identify the distance to the object.

Then, from the identified actual size (the width, the height, and the depth) of an object, the second generating unit 500 can identify the type of the object using (Table 1) given below. For example, if the object has the width of 1300 [mm], has the height of 1800 [mm], and has the depth of 2000 [mm]; then the object can be identified to be a "standard-sized vehicle". Meanwhile, the information in which the width, the height, and depth, and the type (object type) of the objects as held in a corresponding manner in (Table 1) can be stored as a table in the RAM 54.

TABLE 1

| Object type | Width | Height | Unit (mm) Depth |
|---|---|---|---|
| Automobile, bicycle | <1100 | <2500 | >1000 |
| Pedestrian | <1100 | <2500 | ≤1000 |
| Compact vehicle | <1700 | <1700 | <10000 |
| Standard-sized vehicle | <1700 | <2500 | <10000 |

TABLE 1-continued

| Object type | Width | Height | Unit (mm) Depth |
|---|---|---|---|
| Cargo truck | <3500 | <3500 | <15000 |
| Other | Vehicles not fitting in sizes mentioned above | | |

Meanwhile, the third generating unit 501, the fourth generating unit 502, and the fifth generating unit 503 of the second generating unit 500 illustrated in FIG. 9 are implemented using the FPGA 51 illustrated in FIG. 6. Alternatively, instead of using the FPGA 51 that is a hardware circuit, some or all of the third generating unit 501, the fourth generating unit 502, and the fifth generating unit 503 can be implemented as a result of execution of programs, which are stored in the ROM 53, by the CPU 52.

As described above, the fifth generating unit 503 generates the real U map RM from the U map UM or from the parallax image, and the fourth generating unit 502 generates the U map UM from the parallax image. Given below is the explanation of the advantages of the real U map RM and the U map UM in image processing. Firstly, as far as the advantages of the real U map RM are concerned, for example, advantages (1) and (2) are explained below.

(1) Regarding the processing of recognizing (detecting) an object, since the actual distance represents the horizontal axis, the detection can be done in a stable manner and at a faster pace for any distance.

(2) Regarding the processing of detecting the faces of an object, the shape of the object does not change according to the angle of view (the angle from the object with respect to the object recognizing device 1), and the same features can be seen at any distance. Hence, image processing can be performed using the same algorithm.

As far as the advantages of the U map UM are concerned, for example, advantages (3) and (4) are explained below.

(3) Regarding the processing of recognizing (detecting) objects, with respect to the objects at shorter distances, the masses of pixel values (objects) do not get easily connected to each other thereby making it easier to detect them as individual objects.

(4) Regarding the processing of detecting the faces of an object, since the x-axis of the reference image Ia represents the horizontal axis, the features of inclined portions are easily detectable.

Figure 13:
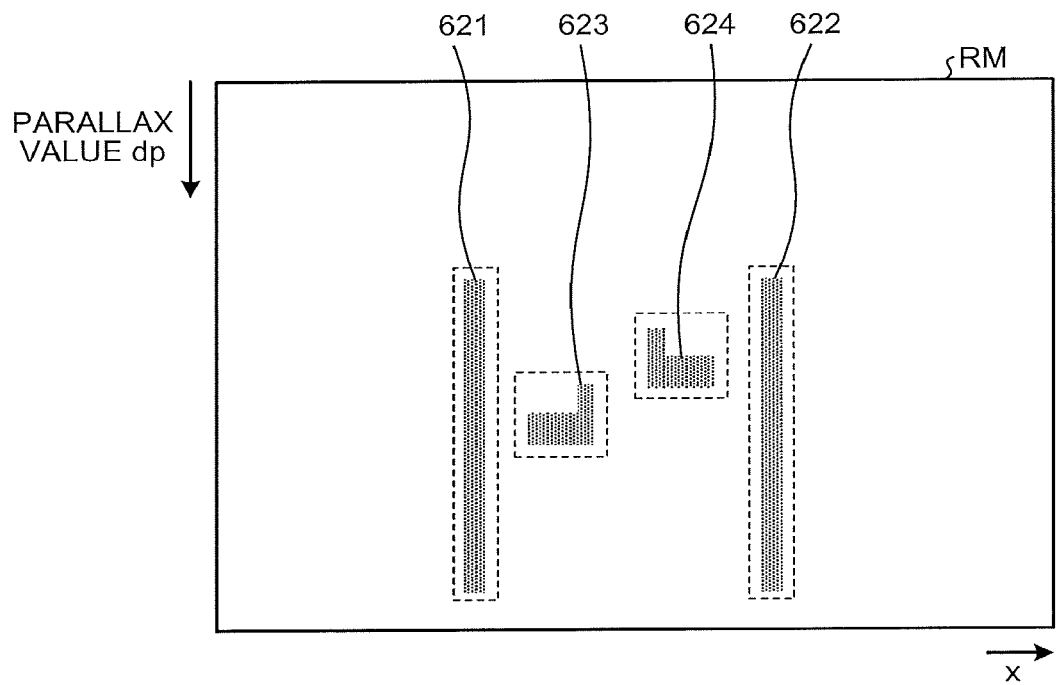
FIG. 13 is a diagram for explaining processing of extracting isolated areas from a real U map.
Figure 14A:
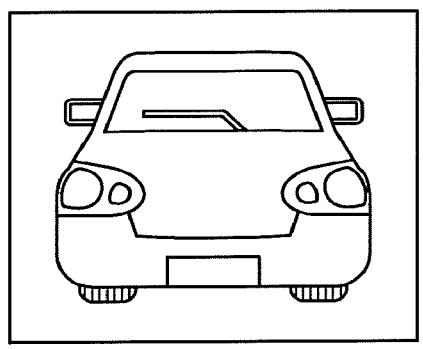
FIGS. 14A to 14C are diagrams illustrating recognition areas of objects corresponding to the extracted isolated areas.
Figure 14B:
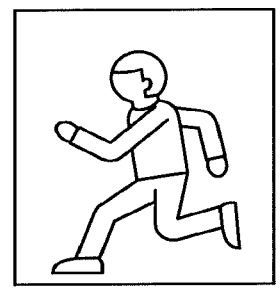
Figure 14C:
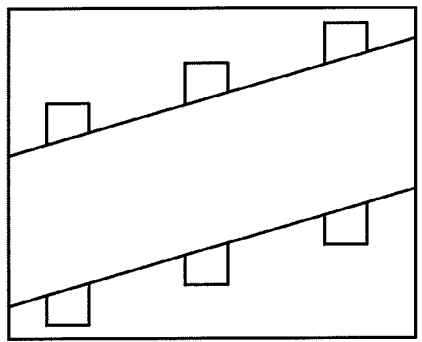
Figure 15A:
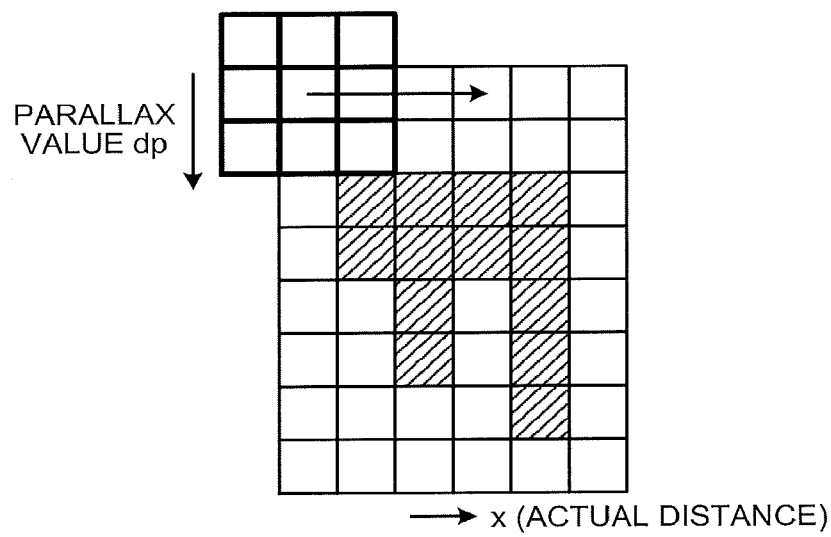
FIGS. 15A to 15C are diagrams for explaining processing of smoothing performed with respect to the isolated areas.
Figure 15B:
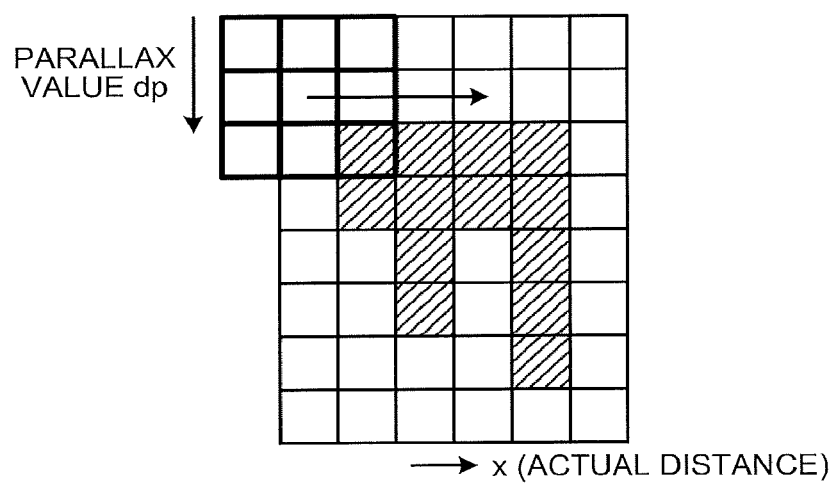
Figure 15C:
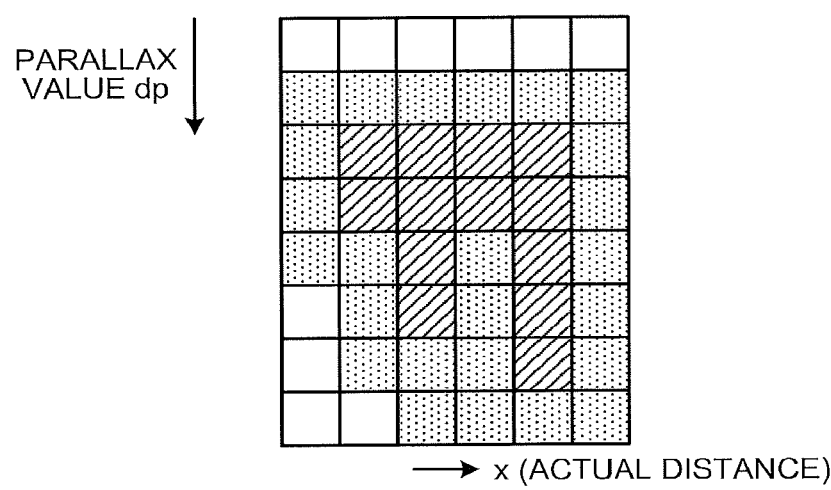
Figure 16A:
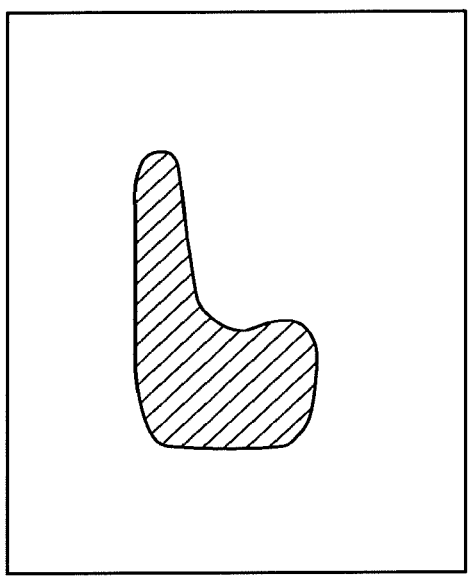
FIGS. 16A and 16B are diagrams for explaining the overview of contour extraction processing performed with respect to the isolated areas.
Figure 16B:
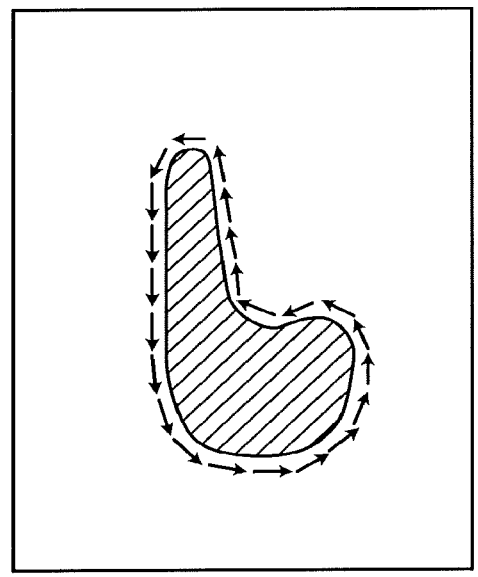
Figure 18A:
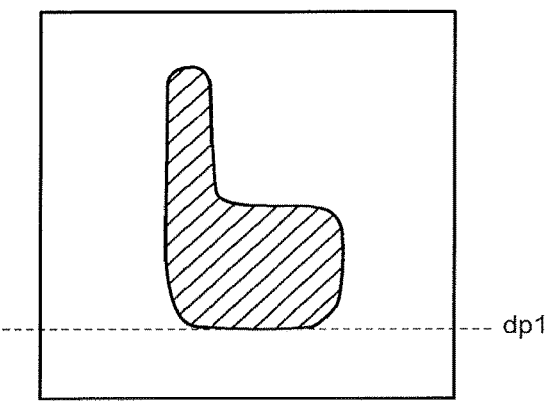
FIGS. 18A to 18E are diagrams for explaining processing of detecting the back face and the lateral faces of an isolated area.
Figure 18B:
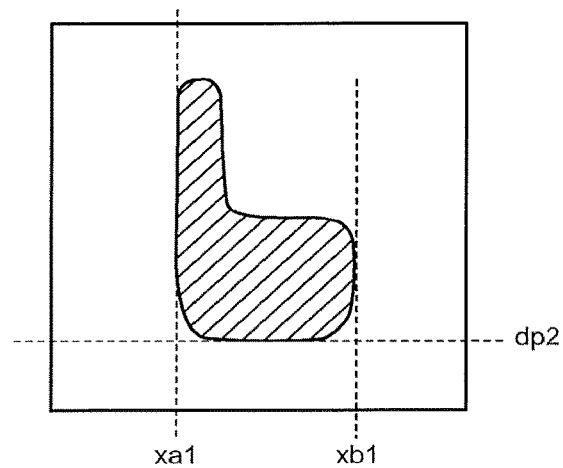
Figure 18C:
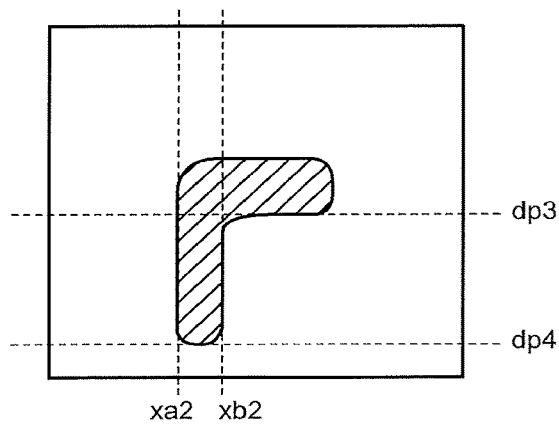
Figure 18D:
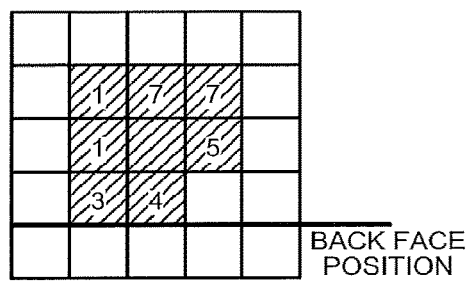
Figure 18E:
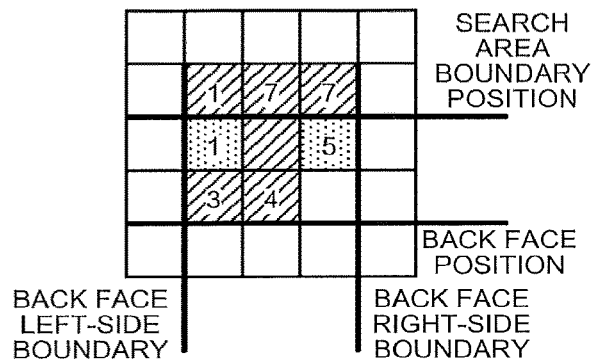
Figure 19A:
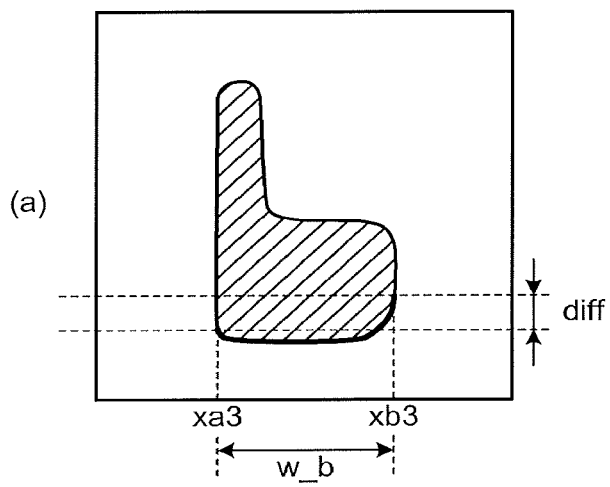
FIGS. 19A to 19C are diagrams for explaining processing of determining whether or not the detected back face has validness.
Figure 19B:
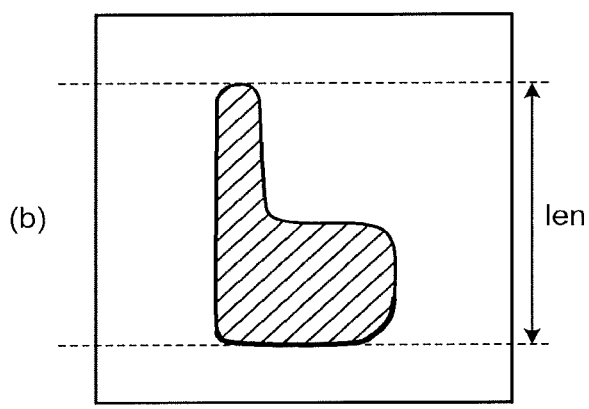
Figure 19C:
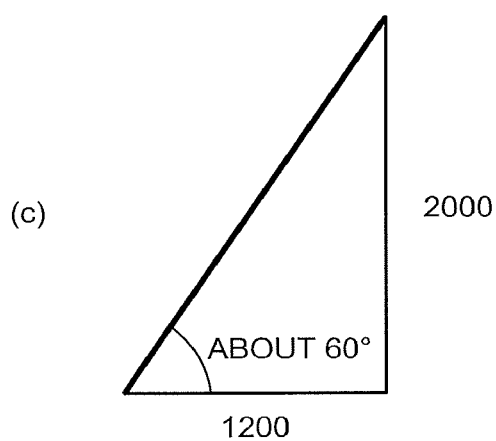

FIG. 13 is a diagram for explaining processing of extracting isolated areas from a real U map. FIGS. 14A to 14C are diagrams illustrating recognition areas of objects corresponding to the extracted isolated areas. FIGS. 15A to 15C are diagrams for explaining processing of smoothing performed with respect to the isolated areas. FIGS. 16A and 16B are diagrams for explaining the overview of contour extraction processing performed with respect to the isolated areas. FIGS. 17A to 17F are diagrams for explaining the details of the contour extraction processing performed with respect to the isolated areas. FIGS. 18A to 18E are diagrams for explaining processing of detecting the back face and the lateral faces of an isolated area. FIGS. 19A to 19C are diagrams for explaining processing of determining whether or not the detected back face has validness. FIGS. 20A to 20G are diagrams for explaining processing of cutting a cut area of an isolated area. With reference to FIG. 9 and FIGS. 13 to 20, given below is the explanation of a configuration and operations of the input unit 511 and the first face detecting unit 512 of the clustering unit 510 in the recognizing unit 5.

The input unit 511 is a functional unit that receives input of the reference image Ia and the parallax image that are input by the second generating unit 500; and receives input of the V map VM, the U map UM, the U map UM_H, and the real U map RM that are generated by the second generating unit 500. Then, the input unit 511 sends the reference image Ia, the parallax image, the V map VM, the U map UM, the U map UM_H, and the real U map RM as input information to the first face detecting unit 512. Meanwhile, the input unit 511 is not limited to receiving input of such images from the second generating unit 500; and alternatively can be configured to read and receive input of images stored in a memory medium such as the RAM 34 illustrated in FIG. 6, the RAM 54 illustrated in FIG. 6, a CD (Compact Disc), a DVD (Digital Versatile Disc), or an HDD (Hard Disk Drive); or to read and receive input of images stored in a network storage.

The first face detecting unit 512 is a functional unit that, based on the input information received from the input unit 511, recognizes an object and performs first face detection processing for detecting the back face and the lateral faces of that object. The first face detecting unit 512 particularly treats a vehicle as an object to be recognized, and treats an object (vehicle) having the distance, the width, and the depth as specified in (Table 2) given below as the target for the first face detection processing. In that case, for example, only in the case in which isolated areas (objects) extracted by an area extracting unit 513 (described later) satisfy the conditions given in (Table 2), they can be treated as the targets for the first face detection processing.

TABLE 2

| Item | Details |
|---|---|
| Target width for face detection | Equal to or greater than 1100 [mm] |
| Target depth for face detection | Greater than 1000 [mm] |

The first face detecting unit 512 includes the area extracting unit 513 (a first extracting unit), a smoothing unit 514, a contour extracting unit 515 (a second extracting unit), a back face detecting unit 516 (a detecting unit), a first determining unit 517, and a cutting unit 518 (a deleting unit).

The area extracting unit 513 is a functional unit that extracts isolated areas (first areas), which represent masses of pixel values, from the real U map RM included in the input information that is output from the input unit 511. More particularly, the area extracting unit 513 performs binarization and labelling with respect to the real U map RM, and extracts an isolated area for each set of identification information of the labelling processing. For example, the state in which isolated areas are extracted in the real U map RM is illustrated in FIG. 13. In the example of the real U map RM illustrated in FIG. 13, isolated areas 621 to 624 are extracted as isolated areas by the area extracting unit 513. The isolated areas extracted by the area extracting unit 513 correspond to the objects captured in the reference image Ia, and represent the recognition areas of the objects in the reference image Ia. For example, in FIGS. 14A to 14B is illustrated an example of the recognition areas of the objects in the reference image Ia that correspond to the isolated areas extracted by the area extracting unit 513. In FIG. 14A is illustrated an example of the recognition area of a vehicle. In FIG. 14B is illustrated an example of the recognition area of a person. In FIG. 14C is illustrated an example of the recognition area of guardrails (an example of lateral objects) installed along the sides of the road.

In this way, in the extraction processing performed by the area extracting unit 513 for extracting the isolation areas, as a result of using the real U map RM, the objects (isolated areas) present at any distances can be extracted in a stable manner.

The area extracting unit 513 generates, for each extracted isolated area, recognition area information representing information related to the isolated area; and, for example, specifies, in the recognition area information, the identification information of the labelling processing and the information about the positions and the sizes of the isolated areas in the real U map RM. Then, the area extracting unit 513 sends the recognition area information to the smoothing unit 514.

The smoothing unit 514 is a functional unit that performs smoothing with respect to the isolated areas, which are extracted by the area extracting unit 513, for alleviating the noise and the parallax dispersion present in the real U map RM. More particularly, as illustrated in FIG. 15A, the smoothing unit 514 prepares a 3×3 mask and performs raster scanning with respect to the isolated areas; and, as illustrated in FIG. 15B, when the pixels of an isolated area overlap with some part of the mask, if there are no pixel values in the central part of the mask, smoothing is performed by filling pixel values in that central part. Examples of the pixel values to be filled include the pixel values (frequencies) of such pixels onto which the mask overlaps from among the pixels of the isolated area, and the identification of the labelling assigned to that isolated area. In this way, as a result of filling the pixel values in the isolated areas by the smoothing unit 514, as illustrated in FIG. 15C, pixel values get filled in the pixels surrounding an original single pixel of the isolated area. Thereinafter, the area formed by combining the original isolated area and the area in which the pixel values are filled with respect to the isolated area is treated as the new isolated area. Then, the smoothing unit 514 specifies, in the recognition area information, the information about the position and the size of each new isolated area in the real U map RM; and sends the recognition area information to the contour extracting unit 515.

The contour extracting unit 515 is a functional unit that, regarding the pixels forming the contour of each isolated area that has been smoothed in the real U map RM by the smoothing unit 514, identifies the directional vectors (contour vectors) between adjacent pixels and extracts the contour. As far as the overview of counter extraction is concerned, regarding the pixels forming the contour of a particular isolated area illustrated in FIG. 16A, the contour extracting unit 515 identifies the directional vectors between adjacent pixels as illustrated in FIG. 16B. More particularly, firstly, a 3×3 mask is prepared that is as illustrated in FIG. 17B and that has numbers from "0" to "7" assigned to the pixels around the pixel of interest representing the central pixel. Then, as illustrated in FIG. 17A, the contour extracting unit 515 scans the mask against the isolated area from bottom to top and from left to right, and continues with the scanning until the pixel of interest of the mask overlaps with a pixel of the isolated area as illustrated in FIG. 17C. Then, centered around the pixel corresponding to the pixel of interest in the mask, the contour extracting unit 515 searches for the pixels included in the isolated area in the counterclockwise direction starting from the pixel having the number "3" of the mask (i.e., in the order of "3, 4, 5, 6, 7, 0, 1, 2"). In the case illustrated in FIG. 17C, since a pixel on the right-hand side of the pixel corresponding to the pixel of interest is found, the contour extracting unit 515 assigns the number "3", which is assigned to the pixel on the right-hand side, as the information indicating the contour vector of the pixel corresponding to the pixel of interest as illustrated in FIG. 17D. That is, that pixel in the isolated area which has "3" assigned thereto (i.e., the pixel corresponding to the pixel of interest) is identified to have an adjacent pixel in the direction of the pixel having "3" assigned thereto with reference to the pixel of interest in the mask.

Subsequently, with respect to the adjacent pixel identified according to the contour vector (in the example illustrated in FIGS. 17A to 17F, the pixel on the right-hand side of the pixel having "3" assigned thereto), the contour extracting unit 515 allocates the mask in such a way that the pixel of interest overlaps with the concerned pixel. In this case, centered around the pixel corresponding to the pixel of interest in the mask, the contour extracting unit 515 searches for the pixels included in the isolated area in the counterclockwise direction starting from the position advanced by one pixel in the counterclockwise direction from the pixel for which the contour vector was identified in the last instance (the pixel having the number "3" assigned thereto in FIG. 17D) (i.e., in the order of "0, 1, 2, 3, 4, 5, 6, 7"). In the case illustrated in FIG. 17E, since a pixel on the upper right of the pixel corresponding to the pixel of interest is found, the contour extracting unit 515 assigns the number "4", which is assigned to the pixel on the upper right, as the information indicating the contour vector of the pixel corresponding to the pixel of interest. As a result of identifying contour vectors in the manner described above, as illustrated in FIG. 17F, numbers (information) indicating the contour vectors get assigned to the pixels forming the contour of the concerned isolated area.

In this way, in the extraction processing performed by the contour extracting unit 515 for extracting the contour, as a result of using the real U map RM, since the shape of the object does not change according to the angle of view, the contour based on the directions among the pixels constituting the contour of the concerned isolated area can be extracted using the same algorithm at any distance. That enables achieving enhancement in the accuracy of detecting the faces based on the extracted contour.

The contour extracting unit 515 specifies, in the recognition area information, the information indicating the contour vectors assigned to the pixels forming the contour of the isolated area; and sends the recognition area information to the back face detecting unit 516. Meanwhile, in the case of searching for the pixels of an isolated area, it is assumed that the search is performed in the counterclockwise direction centered around the pixel corresponding to the pixel of interest. That is applicable in the case in which the scanning direction is from bottom to top and from left to right. Alternatively, if the scanning direction is from bottom to top and from right to left, then the search needs to be performed in the clockwise direction centered around the pixel of interest. Moreover, the intention behind scanning the mask from bottom is as follows. In the real U map RM, lower the position of the isolated area, the closer is the object. Hence, closer objects are treated as the targets for control in the subsequent stages on a priority basis as compared to farther objects.

The back face detecting unit 516 is a functional unit that, in the real U map RM, detects the position of the back face (a first face) and the lateral faces (second faces) of each isolated area whose contour has been extracted by the contour extracting unit 515. More particularly, the back face detecting unit 516 implements two methods as detection methods for detecting the position of the back face of an isolated area. Hereinafter, the two methods are referred to as a "first detection method" and a "second detection method".

Firstly, the explanation is given about the detection of the position of the back face according to the first detection method. The back face detecting unit 516 identifies the positions in the parallax value dp direction of the pixels for which the information indicating the contour vector of the isolated area as identified by the contour extracting unit 515 is either "2", or "3", or "4", that is, the pixels having the highest number of contour vectors oriented rightward from the left-hand side. For example, as illustrated in FIG. 18A, if it is determined that the number of pixels having information indicating the contour vector to be either "2", or "3", or "4" is the highest at a back face position dp1 in the vertical direction (the parallax value dp direction) in the isolated area, then the back face detecting unit 516 detects the back face position dp1 as the position of the back face (the position in the parallax value dp direction) of the isolated area.

Given below is the explanation of the detection of the position of the back face according to the second detection method. Firstly, the back face detecting unit 516 identifies, as a left-side position xa1 illustrated in FIG. 18B, the positions in the x direction of the pixels for which the information indicating the contour vector of the isolated area as identified by the contour extracting unit 515 is either "0", or "1", or "2", that is, the pixels having the highest number of contour vectors oriented downward from the upper side. Then, the back face detecting unit 516 identifies, as a right-side position xb1 illustrated in FIG. 18B, the positions in the x direction of the pixels for which the information indicating the contour vector of the isolated area as identified by the contour extracting unit 515 is either "4", or "5", or "6", that is, the pixels having the highest number of contour vectors oriented upward from the lower side. Subsequently, the back face detecting unit 516 identifies, within the range between the left-side position xa1 and the right-side position xb1 in the isolated area, the positions in the parallax value dp direction of the pixels for which the information indicating the contour vectors of the isolated area as identified by the contour extracting unit 515 is either "2", or "3", or "4", that is, the pixels having the highest number of contour vectors oriented rightward from the left-hand side. As illustrated in FIG. 18B, in the isolated area within the range between the left-side position xa1 and the right-side position xb1, if it is determined that the number of pixels having information indicating the contour vectors to be either "2", or "3", or "4" is the highest at a back face position dp2 in the vertical direction (the parallax value dp direction), then the back face detecting unit 516 detects the back face position dp2 as the position of the back face (the position in the parallax value dp direction) of the isolated area.

However, there are times when the position of the back face of the isolation area as detected according to the first detection method is different than the position detected according to the second detection method. For example, in the case of the isolated area illustrated in FIG. 18C, the positions in the parallax value dp direction of the pixels having the highest number of contour vectors oriented rightward from the left-hand side, that is, the position of the back face of the isolated area identified according to the first detection method is a back face position dp3. On the other hand, if the positions in the x direction of the pixels having the highest number of contour vectors oriented downward from the upper side is a left-side position xa2 and if the positions in the x direction of the pixels having the highest number of contour vectors oriented upward from the lower side is a right-side position xb2; then, within the range between the left-side position xa1 and the right-side position xb1 in the isolated area, the positions in the parallax value dp direction of the pixels having the highest number of contour vectors oriented rightward from the left-hand side, that is, the position of the back face of the isolated area identified according to the second detection method is a back face position dp4. In this way, as the position of the back face of the isolation area, the back face position dp3 is detected in the first detection method and the back face position dp4 is detected in the second detection method. Thus, there are times when different positions of the back face are detected. In such a case, for example, according to the determination of validness of the back face as performed by the first determining unit 517 (described later), the position of the back face determined to have validness as the back face can be selected.

Meanwhile, the back face detecting unit 516 is not limited to detecting the position of the back face according to the first detection method as well as the second detection method, and alternatively can be configured to detect the position of the back face according to either the first detection method or the second detection method.

Subsequently, the back face detecting unit 516 detects the positions of the lateral faces of the isolated area. More particularly, as illustrated in FIG. 18D, from the parallax value dp of the detected position of the back face, the back face detecting unit 516 calculates the distance to the back face. Then, the back face detecting unit 516 identifies a predetermined position in the depth side (a search area boundary position) from the detected position of the back face. For example, as illustrated in FIG. 18E, the back face detecting unit 516 sets a position up to 110[%] of the distance to the back face from the position of the back face as the search area boundary position. Then, within the range from the position of the back face to the search area boundary position in the parallax value dp direction in the isolated area, the back face detecting unit 516 detects, as the position of the left lateral face of the isolated area (a "back face left-side boundary" illustrated in FIG. 18E), the positions in the x direction of the pixels for which the information indicating the contour vector of the isolated area is either "0", or "1", or "2", that is, the pixels having the highest number of contour vectors oriented downward from the upper side. Moreover, within the range from the position of the back face to the search area boundary position in the parallax value dp direction in the isolated area, the back face detecting unit 516 detects, as the position of the right lateral face of the isolated area (a "back face right-side boundary" illustrated in FIG. 18E), the positions in the x direction of the pixels for which the information indicating the contour vector of the isolated area is either "4", or "5", or "6", that is, the pixels having the highest number of contour vectors oriented upward from the lower side.

In this way, in the detection processing performed by the back face detecting unit 516 for detecting the position of the back face and the positions of the lateral faces of the isolated area, as a result of using the real U map RM, the shape of the object does not change according to the angle of view, and thus the position of the back face and the positions of the lateral faces can be detected in a stable manner for any distance.

Then, the back face detecting unit 516 specifies, in the recognition area information, the information about the position of the back face and the positions of the lateral faces (the left lateral face and the right lateral face) as detected in the concerned isolated area; and sends the recognition area information to the first determining unit 517.

The first determining unit 517 is a functional unit that determines whether or not the back face detected in the real U map RM by the back face detecting unit 516 has been correctly detected, that is, determines the validness of the back face. More particularly, the first determining unit 517 determines whether or not the back face detected by the back face detecting unit 516 satisfies all conditions specified as an example in (Table 3) given below; and, if all conditions are satisfied, determines that the back face has been correctly detected.

TABLE 3

| Item | Details |
|---|---|
| Width of back face (w_b) | Equal to or greater than 1100 [mm] |
| Difference in left-right distance of back face (diff) | Smaller than 25% of closest distance |
| Overall depth of isolated area (len) | Greater than 1000 [mm] |

For example, assume that the back face detecting unit 516 detects, as the back face, the portion drawn using a heavy line in the isolated area illustrated in FIG. 19A. Herein, as illustrated in FIG. 19A, a left position xa3 represents the position of the left lateral face of the isolated area as detected by the back face detecting unit 516, and a right position xb3 represents the position of the right lateral face of the isolated area as detected by the back face detecting unit 516. The first determining unit 517 calculates a width w_b of the back face of the isolated area according to the left position xa3 and the right position xb3. Then, the first determining unit 517 determines whether or not the width w_b satisfies predetermined conditions. In the example of (Table 3) given above, the first determining unit 517 determines whether or not the width w_b is equal to or greater than 1100 [mm].

Moreover, the first determining unit 517 determines whether or not a difference diff between the distance obtained from the parallax value of the left end of the back face (the left position xa3 in the x direction) as detected by the back face detecting unit 516 and the distance obtained from the parallax value of the right end of the back face (the right position xb3 in the x direction) as detected by the back face detecting unit 516 satisfies predetermined conditions. In the example of (Table 3) given above, the first determining unit 517 determines whether or not the difference diff is smaller than 25[%] of the distance to the closest portion of the back face. However, the determination is not limited to determining whether or not the difference diff is smaller than 25[%] of the distance to the closest portion, and alternatively the determination can be performed using the value regarding the distance in which the parallax error component is taken into account.

Moreover, as illustrated in FIG. 19B, the first determining unit 517 calculates a depth len of the isolated area. Then, the first determining unit 517 determines whether or not the depth len satisfies predetermined conditions. In the example of (Table 3) given above, the first determining unit 517 determines whether or not the depth len is greater than 1000 [mm].

For example, in the case of applying the conditions specified in (Table 3), if a vehicle having the distance of 8 [m] to the back face of an object has the back face with a width of 1200 [mm], then 25[%] of the distance of 8 [m] is equal to 2000 [mm] and, as illustrated in FIG. 19C, the back face is determined to have validness with a limit of about 60[0] on the inclination.

In this way, in the determination processing performed by the back face detecting unit 516 for determining the validness of the back face, as a result of using the real U map RM, since the shape of the object does not change according to the angle of view, the determination of validness can be performed in a stable manner for the back face of an object present at any distance.

The first determining unit 517 specifies, in the recognition area information, the result of whether or not the back face detected by the back face detecting unit 516 is correctly detected, that is, the result of the determination about the validness of the back face. If the back face is determined to have been correctly detected, then the first determining unit 517 sends the recognition area information to the cutting unit 518. On the other hand, if the back is determined to not have been correctly detected, then the first determining unit 517 sends the recognition area information to the frame creating unit 519.

Figure 20A:
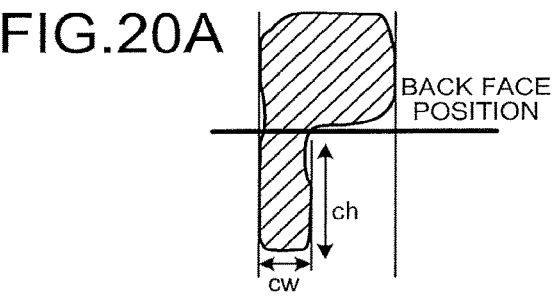
FIGS. 20A to 20G are diagrams for explaining processing of cutting a cut area of an isolated area.

The cutting unit 518 is a functional unit that, when the first determining unit 517 determines that the back face has validness, cuts (deletes), in the real U map RM, areas deemed unnecessary (cut areas) in the isolated area specified in the recognition area information received from the first determining unit 517. More particularly, firstly, for example, the cutting unit 518 determines whether or not conditions specified in (Table 4) given below are satisfied by the isolated area and accordingly determines whether or not the isolated area is to be treated as the target for cutting the cut areas. For example, as illustrated in FIG. 20A, regarding the width (a cut width cw) and the depth (a cut height ch) of the area located nearer than the back face position of the isolated area, if the ratio ch/cw is equal to or greater than two and if the cut height ch is equal to or greater than 40[%] of the distance to the isolated area, then the cutting unit 518 determines that the isolated area is to be treated as the target for cutting the cut area. Meanwhile, the determination is not limited to determining whether or not the cut height ch is equal to or greater than 40[%] of the distance to the isolated area, and alternatively the determination can be performed using the value regarding the distance in which the parallax error component or the noise is taken into account.

TABLE 4

| Item | Details |
|---|---|
| Vertical-horizontal ratio of area located nearer than back face (ch/cw) | Equal to or greater than 2 |
| Cut height (ch) | Equal to or greater than 40% of distance of isolated area |

Figure 20B:
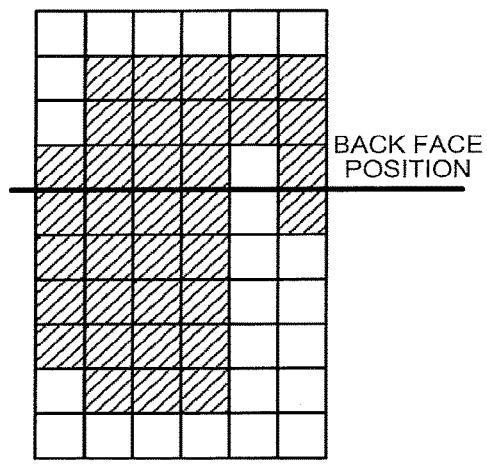

When the isolated area is determined to be the target for cutting the cut area, the cutting unit 518 specifies a bulging area from the area located nearer than the back face position of the isolated area. Specifically, the cutting unit 518 uses the pixels in the area located nearer than the back face position of the isolated area as illustrated in FIG. 20B and creates a histogram as illustrated in FIG. 20C. In the histogram, for example, the frequencies along the vertical axis can be set to be the pixel count at the corresponding positions in the x-axis. In the histogram, the cutting unit 518 identifies the x position of the highest graphs. In the example illustrated in FIG. 20C, the second to fourth graphs from left in the x direction are identified. Then, from the x positions of the highest graphs, the cutting unit 518 identifies graphs that continuously have the height of, for example, equal to or greater than 80[%] of the height of the highest graphs. In the example illustrated in FIG. 20C, the first graph from left that is adjacent to the second graph from left representing one of the highest graphs is identified to have the height of 80[%] of more than the height of the highest graphs. The cutting unit 518 identifies, as a bulging area, the area located nearer than the back face position in the isolated area corresponding to the identified highest graphs (the second to fourth graphs from left in the x direction) and the area located nearer than the back face position in the isolated area corresponding to the graphs continuously having the height equal to or greater than 80[%] (the first graph from left in the x direction) (a bulging area PA1 indicated in FIG. 20D).

Figure 20E:
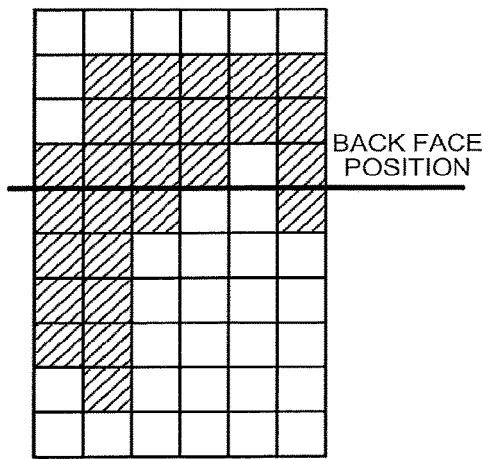
Figure 20C:
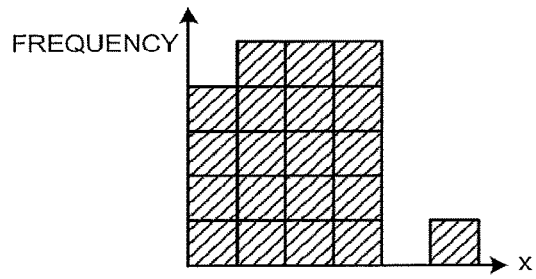
Figure 20F:
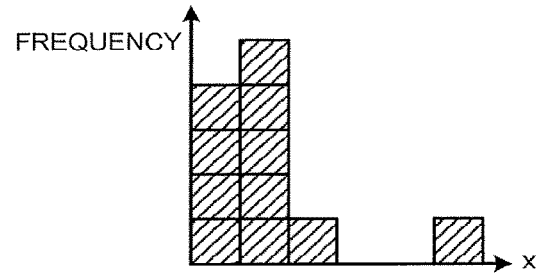

In the example illustrated in FIG. 20E, the cutting unit 518 uses the pixels in the area located nearer than the back face position of the isolated area and creates a histogram as illustrated in FIG. 20F. In this histogram, the cutting unit 518 identifies the x positions of the highest graphs. In the example illustrated in FIG. 20F, the second graph from left in the x direction is identified. Then, from the x position of the highest graph, the cutting unit 518 identifies graphs that continuously have the height of, for example, equal to or greater than 80[%] of the height of the highest graph. In the example illustrated in FIG. 20F, the first graph from left that is adjacent to the second graph from left representing the highest graph is identified to have the height equal to or greater than 80[%] of the height of the highest graph. However, the third graph from left that is adjacent to the second graph from left representing the highest graph does not have the height equal to or greater than 80[%] of the height of the highest graph, and is thus ignored. The cutting unit 518 identifies, as a bulging area, the area located nearer than the back face position in the isolated area corresponding to the identified highest graph (the second graph from left in the x direction) and the area located nearer than the back face position in the isolated area corresponding to the graph continuously having the height equal to or greater than 80[%] (the first graph from left in the x direction) (a bulging area PA2 indicated in FIG. 20G).

Figure 20D:
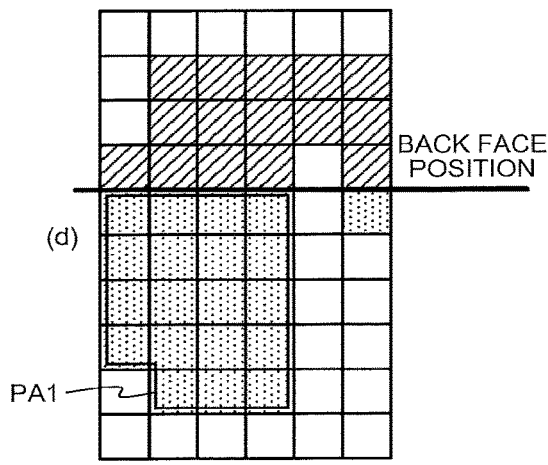
Figure 20G:
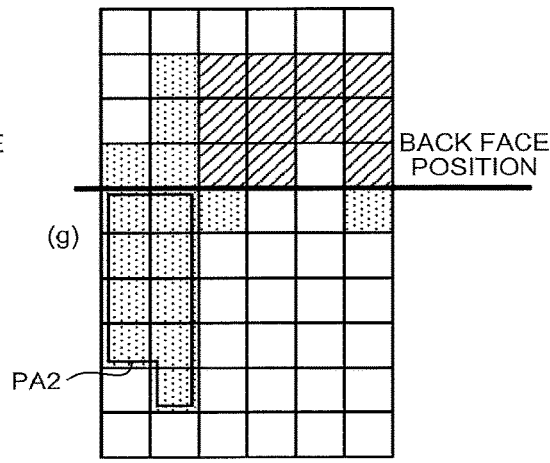

Then, the cutting unit 518 determines whether or not the width in the x direction of each identified bulging area is equal to or greater than half of the overall width of the isolated area. As illustrated in FIG. 20D, when the width of the bulging area PA1 is equal to or greater than half of the overall width of the isolated area, the cutting unit 518 cuts (deletes) the area (a second area) located nearer than the back face position including the bulging area PA1, and sets the post-cutting area as the new isolated area. Herein, only the area located nearer than the back face position including the bulging area PA1 is cut because, when the width of the bulging area PA1 is equal to or greater than half of the overall width of the isolated area, there is a possibility that a vehicle is included in the bulging area. Moreover, as illustrated in FIG. 20G, when the width of the bulging area PA2 is smaller than half of the width of the isolated area, the cutting unit 518 cuts (deletes), from the isolated area, the area located nearer than the back face position and including the bulging area PA2 and the area located farther than the back face position corresponding to the bulging area PA2; and sets the post-cutting area as the new isolated area. Herein, not only the area located nearer than the back face position including the bulging area PA2 is cut, but also the area located farther than the back face position corresponding to the bulging area PA2 is cut. That is because, it is highly likely that the bulging area is a lateral object, and it is believed that there is a low impact even if cutting is done till the farther area.

Herein, in the identification of bulging areas, by identifying areas having the height equal to or greater than 80[%] of the maximum height in the histogram, the identification can be done in a state in which the effect of noise is suppressed. Meanwhile, although the cutting unit 518 is configured to determine whether or not the width of the bulging areas is equal to or greater than half of the overall width of the isolated area, the determination criterion is not limited to the half of the overall width. Alternatively, for example, it can be determined whether or not the width of the bulging areas is equal to or greater than one-third of the overall width of the isolated area.

In this way, in the cutting processing performed by the cutting unit 518 for cutting the cut areas in the isolated area, as a result of using the real U map RM, the shape of the object does not change according to the angle of view, and thus the cut areas can be decided in a stable manner in the isolated area present at any distance.

The cutting unit 518 specifies information about the position and the size of the post-cutting new isolated area in the recognition area information, and sends the recognition area information to the frame creating unit 519.

The input unit 511 as well as the area extracting unit 513, the smoothing unit 514, the contour extracting unit 515, the back face detecting unit 516, the first determining unit 517, and the cutting unit 518 of the first face detecting unit 512 illustrated in FIG. 9 are implemented using the FPGA 51 illustrated in FIG. 6. Alternatively, instead of using the FPGA 51 that is a hardware circuit, some or all of the input unit 511 as well as the area extracting unit 513, the smoothing unit 514, the contour extracting unit 515, the back face detecting unit 516, the first determining unit 517, and the cutting unit 518 can be implemented as a result of execution of programs, which are stored in the ROM 53, by the CPU 52.

Moreover, in the first face detecting unit 512, the processing performed by the smoothing unit 514, the first determining unit 517, and the cutting unit 518 are not necessarily mandatory processing. Thus, the configuration can be such that at least either one of the smoothing unit 514, the first determining unit 517, and the cutting unit 518 is omitted.

Meanwhile, a "first processing unit" according to the present invention is equivalent to the first face detecting unit 512 from which the area extracting unit 513 is excluded; and "first processing" is equivalent to the first face detection processing, which is performed by the first face detecting unit 512, with the exception of the processing of extracting isolated areas as performed by the area extracting unit 513.

Figure 21:
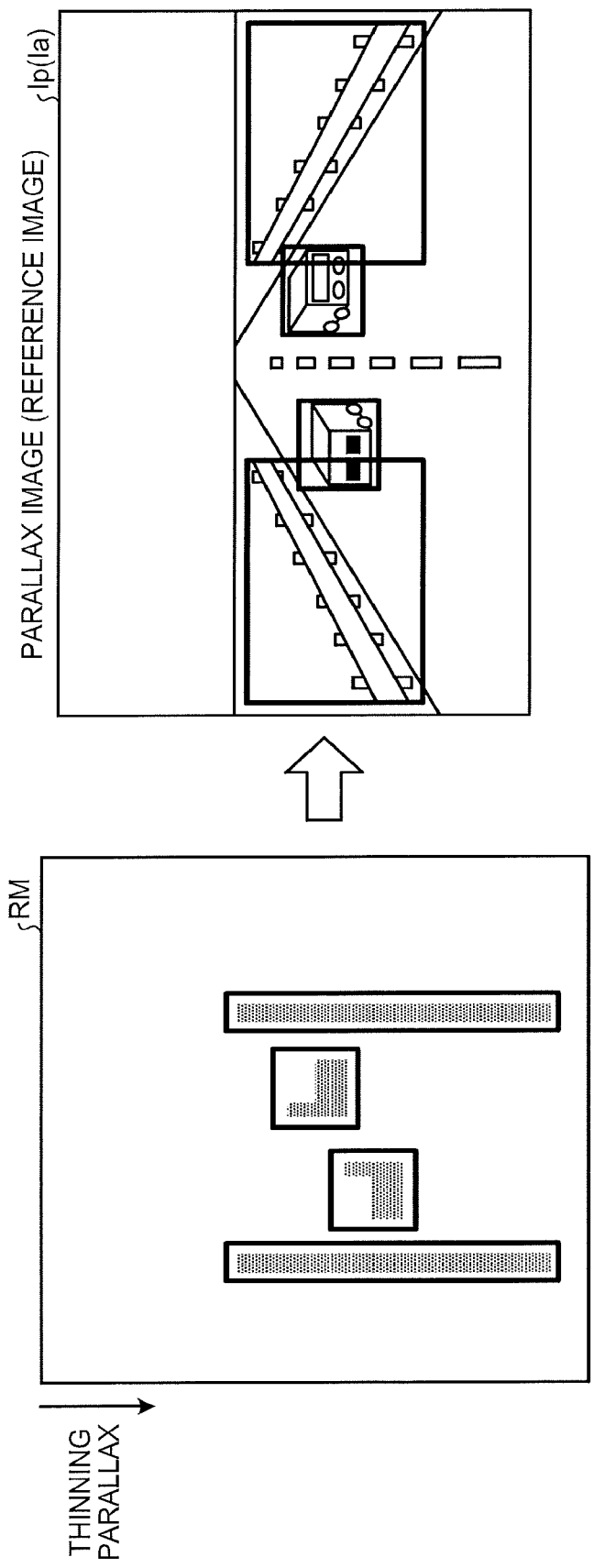
FIG. 21 is a diagram for explaining processing of creating a detection frame.

FIG. 21 is a diagram for explaining processing of creating a detection frame. Explained below with reference to FIGS. 9 and 21 are the operations of the frame creating unit 519 of the clustering unit 510 of the recognizing unit 5.

The frame creating unit 519 is a functional unit that uses each such isolated area in the real U map RM which has been extracted by the area extracting unit 513, which has been smoothened by the smoothing unit, whose contour has been extracted by the contour extracting unit 515, whose back face and lateral faces have been detected by the back face detecting unit 516, and whose redundant portion has been cut (deleted) by the cutting unit 518; and creates a frame for the area (recognition area) of such an object in the parallax image Ip (or the reference image Ia) which corresponds to the isolated area. Then, the frame creating unit 519 specifies, in the recognition area information, the information about the frame created in the parallax image Ip (or the reference image Ia); and sends the recognition area information to the second face detecting unit 520.

The frame creating unit 519 is implemented using the FPGA 51 illustrated in FIG. 6. Alternatively, instead of using the FPGA 51 that is a hardware circuit, the frame creating unit 519 can be implemented as a result of execution of programs, which are stored in the ROM 53, by the CPU 52.

Figure 22:
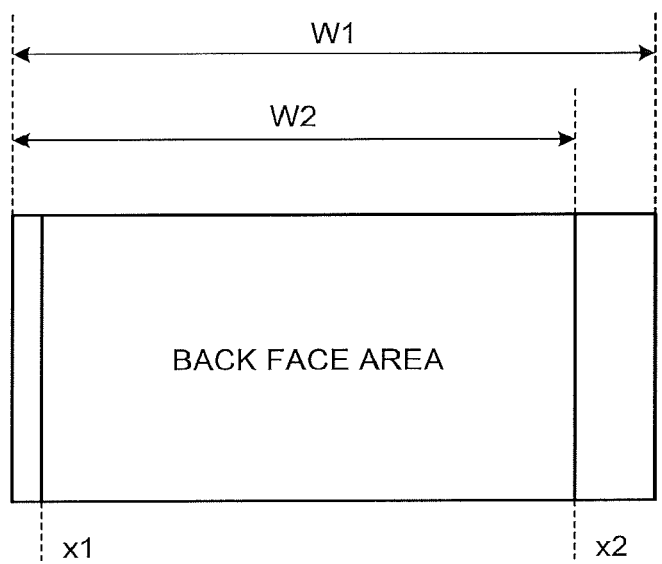
FIG. 22 is a diagram for explaining processing of selecting one of the lateral faces and processing of determining the back face area.

FIG. 22 is a diagram for explaining processing of selecting one of the lateral faces and processing of determining the back face area. FIG. 23 is a diagram for explaining processing of determining whether or not a lateral-faced object is present. Explained below with reference to FIGS. 9, 22, and 23 is a configuration and operations of the second face detecting unit 520 and the output unit 524 of the clustering unit 510 of the recognizing unit 5.

The second face detecting unit 520 is a functional unit that performs second face detection processing (second processing) and, based on the input information that is input by the input unit 511 and based on the recognition area information that is received from the frame creating unit 519, specifically identifies the area of the back face and the areas of the lateral faces of the object specified in the recognition area information and identifies the types of faces of the objects. The second face detecting unit 520 includes a selecting unit 521, a second determining unit 522, and a third determining unit 523 (a determining unit).

The selecting unit 521 is a functional unit that, when the first determining unit 517 determines that the back face of the isolated area has been correctly detected, makes selection about which one of the two lateral faces detected by the back face detecting unit 516 is to be treated as the lateral face. More particularly, as illustrated in FIG. 22, in such a recognition area in the parallax image Ip which corresponds to the isolated area specified in the recognition area information, of the x positions of the two lateral faces (a left lateral face position x1 and a right lateral face position x2 illustrated in FIG. 22), the selecting unit 521 selects the lateral face closer to the center of the parallax image Ip (in the example illustrated in FIG. 22, the lateral face having the right lateral face position x2). Then, the selecting unit 521 specifies the information about the selected lateral face in the recognition area information, and sends the recognition area information to the second determining unit 522.

The second determining unit 522 is a functional unit that determines whether or not the width of the area excluding the lateral face selected by the selecting unit 521 (a width W2 illustrated in FIG. 22) is, for example, equal to or smaller than [90%] of the overall width of the recognition area (a width W1 illustrated in FIG. 22). If it is determined that the width W2 is equal to or smaller than [90%] of the width W1, then the second determining unit 522 determines that the object in the recognition area is an object (vehicle) having the back face and the lateral faces as recognizable faces. That is because, the lateral face selected by the selecting unit 521 can be determined to be in a non-negligibly recognizable state with respect to the back face corresponding to the range from the left lateral face position x1 to the right lateral face position x2. In this case, the second determining unit 522 specifies the determination result in the recognition area information, and sends the recognition area information to the output unit 524.

The third determining unit 523 is a functional unit that, when the first determining unit 517 determines that the back face of the isolated area is not correctly detected, determines whether or not the object represented by the isolated area is a lateral-faced object. Herein, a lateral-faced object implies an object, such as a wall or a guardrail installed on the side of a road or an acoustic barrier of an express highway, that extends in the travelling direction of the vehicle; and only a lateral face thereof is usually visible in the taken images and the parallax image.

More particularly, the third determining unit 523 determines whether or not the isolated area (recognition area) satisfies all exemplary conditions specified in (Table 5) given below; and, when all conditions are satisfied, determines that the object represented by that isolated area (recognition area) is a lateral-faced object.

TABLE 5

| Item | Details |
|---|---|
| Depth (len) | Greater than (1000 [mm] + error component) |
| Four divisions in U map | Areas having higher frequencies are in diagonal relationship |
| Difference in distance of quarter areas at left and right ends in x direction in U map | Equal to or greater than 25% of closest distance |

Figure 23A:
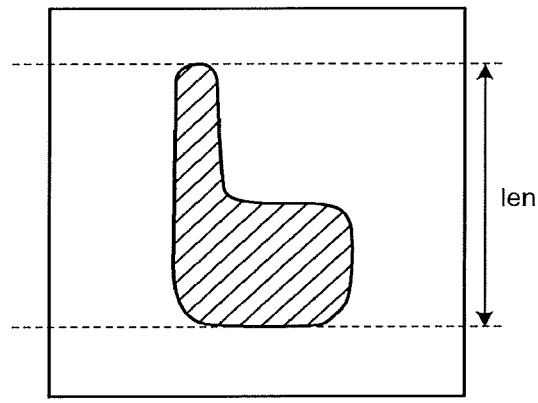
FIGS. 23A to 23C are diagrams for explaining processing of determining whether or not a lateral-faced object is present.
Figure 23B:
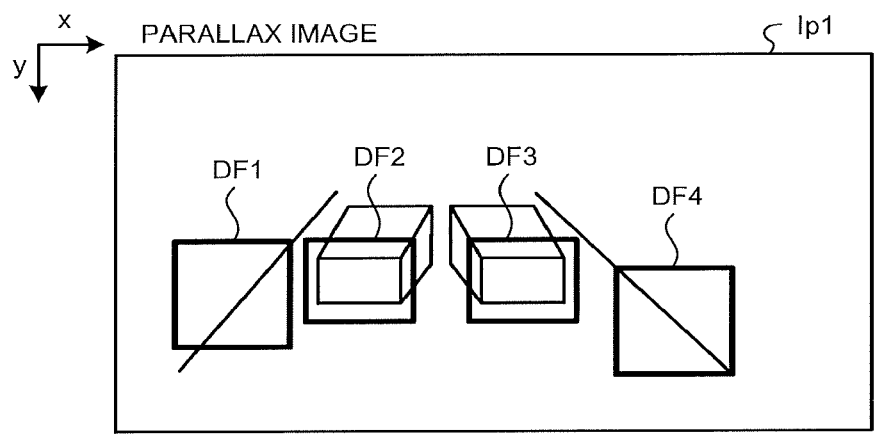

The third determining unit 523 determines whether or not the depth len of the isolated area in the real U map as illustrated in FIG. 23A satisfies predetermined conditions. In the example of (Table 5) given above, the third determining unit 523 determines whether or not the depth len is greater than "1000 [mm]+error component".

Figure 23C:
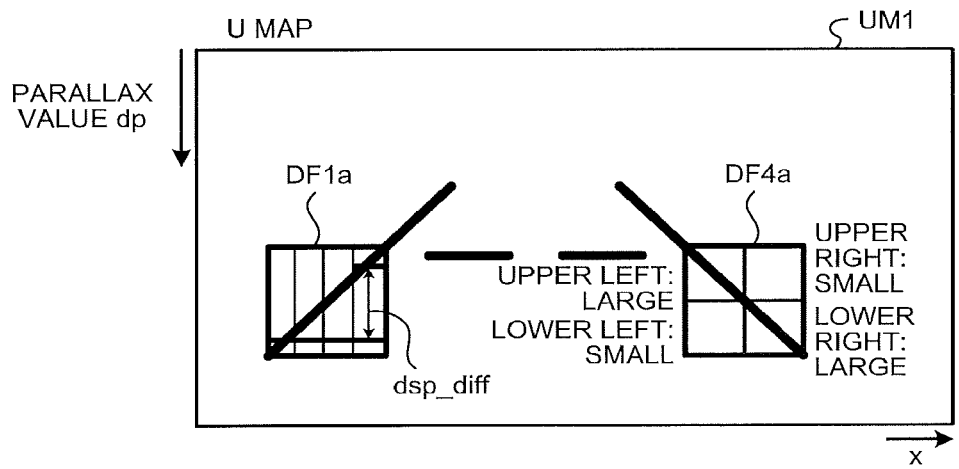

Moreover, the third determining unit 523 converts the frames that represent the recognition areas in the parallax image and that are created by the frame creating unit 519 (in FIG. 23B, detection frames DF1 to DF4 of a parallax image Ip1) into frames in a U map (in FIG. 23C, detection frames DF1a and DF4a in a U map UM1) (third areas). Meanwhile, in FIG. 23C, detection frames corresponding to the detection frames DF2 and DF3 in the parallax images IP1 are not illustrated as a matter of practical convenience. Then, as illustrated in FIG. 23C, the third determining unit 523 divides a detection frame in the U map UM1 into two in the x direction and into two in the parallax value dp direction to form four areas, namely, an upper left area, a lower left area, an upper right area, and a lower right area. Subsequently, the third determining unit 523 calculates the integrated value of the frequencies included in each divided area, and determines whether or not the divided area having the highest integrated value and the divided area having the second highest integrated value from among the four calculated integrated values either are the upper left area and the lower right area or are the lower left area and the upper right area. That is, as specified in (Table 5) given above, the third determining unit 523 determines whether or not the divided areas having higher frequencies are in a diagonal relationship. For example, with reference to the detection frame DF4a in the U map UM1 illustrated in FIG. 23C, the third determining unit 523 determines that, from among the four divided areas, the upper left area and the lower right area have high integrated values of frequency and thus determines that those areas are in a diagonal relationship.

Furthermore, as illustrated in FIG. 23C, the third determining unit 523 divides a detection frame in the U map UM1 into four in the x direction. Then, the third determining unit 523 calculates the average value of the parallax values included in the leftmost divided area and calculates the average value of the parallax values included in the rightmost divided area, and determines whether or not the difference in distances obtained by conversion of the average values (a distance difference dsp_diff) is equal to or greater than 25[%] of the distance to the closest part of the object. For example, with reference to the detection frame DF1a in the U map UM1 illustrated in FIG. 23C, the average value of the parallax values in the rightmost divided area is greater than the average value of the parallax values in the leftmost divided area, and it is determined whether or not the distance difference dsp_diff representing the difference in the average values is equal to or greater than 25[%] of the distance to the closest part of the object represented by the detection frame DF1a. Meanwhile, the determination is not limited to determining whether or not the difference in distances is equal to or greater than 25[%] of the distance to the closest part of the object, and alternatively the determination can be performed using the value regarding the distance in which the parallax error component is taken into account.

When an isolated area (recognition area) satisfies all conditions specified in (Table 5) given above, the third determining unit 523 determines that the object represented by the isolated area (recognition area) is a lateral-faced object. On the other hand, when an isolated area (recognition area) does not satisfy at least one condition specified in (Table 5) given above, the third determining unit 523 determines that the object represented by the isolated area (recognition area) is not a lateral-faced object. Then, the third determining unit 523 specifies the determination result in the recognition area information, and sends the recognition area information, to the output unit 524.

In this way, in the processing performed by the third determining unit 523 for determining whether or not the object represented by an isolated area is a lateral-faced object; as a result of using the U map UM1, since the x-axis of the reference image Ia represents the horizontal axis, the features of the diagonal portion are easy to obtain thereby enabling accurate determination of whether or not the object is a lateral-faced object.

The output unit 524 is a functional unit that outputs the recognition area information, which contains the result of the second face detection processing performed by the second face detecting unit 520, to the tracking unit 530.

Meanwhile, the selecting unit 521, the second determining unit 522, and the third determining unit 523 of the second face detecting unit 520 illustrated in FIG. 9 and the output unit 524 are implemented using the FPGA 51 illustrated in FIG. 6. Alternatively, instead of using the FPGA 51 that is a hardware circuit, some or all of the selecting unit 521, the second determining unit 522, and the third determining unit 523 of the second face detecting unit 520 and the output unit 524 can be implemented as a result of execution of programs, which are stored in the ROM 53, by the CPU 52.

Moreover, the functional units of the recognizing unit 5 illustrated in FIG. 9 are meant to illustrate the functions in a conceptual manner, and the configuration is not limited to the configuration illustrated in FIG. 9. Alternatively, for example, the functional units that are illustrated as independent functional units in the recognizing unit 5 in FIG. 9 can be configured as a single functional unit. In contrast, the functions of a single functional unit in the recognizing unit 5 illustrated in FIG. 9 can be divided into a plurality of functions, and thus the functional unit can be configured as a plurality of functional units.

Meanwhile, with reference to FIGS. 7 to 23 mentioned above, the parallax values are treated to be equivalent to the distance values. Hence, the explanation is given for the operations based on a parallax image representing an example of a distance image. However, that is not the only possible case. Alternatively, the operations can be based on a distance image that is generated on the basis of distance information of millimeter-wave radar or laser radar, or the operations can be based on a distance image that is generated on the basis of integration of the abovementioned distance information and the parallax image obtained by the parallax value deriving unit 3. The same is the case in the following explanation too.

(Block Matching Processing Performed by Parallax Value Deriving Unit)

Figure 24:
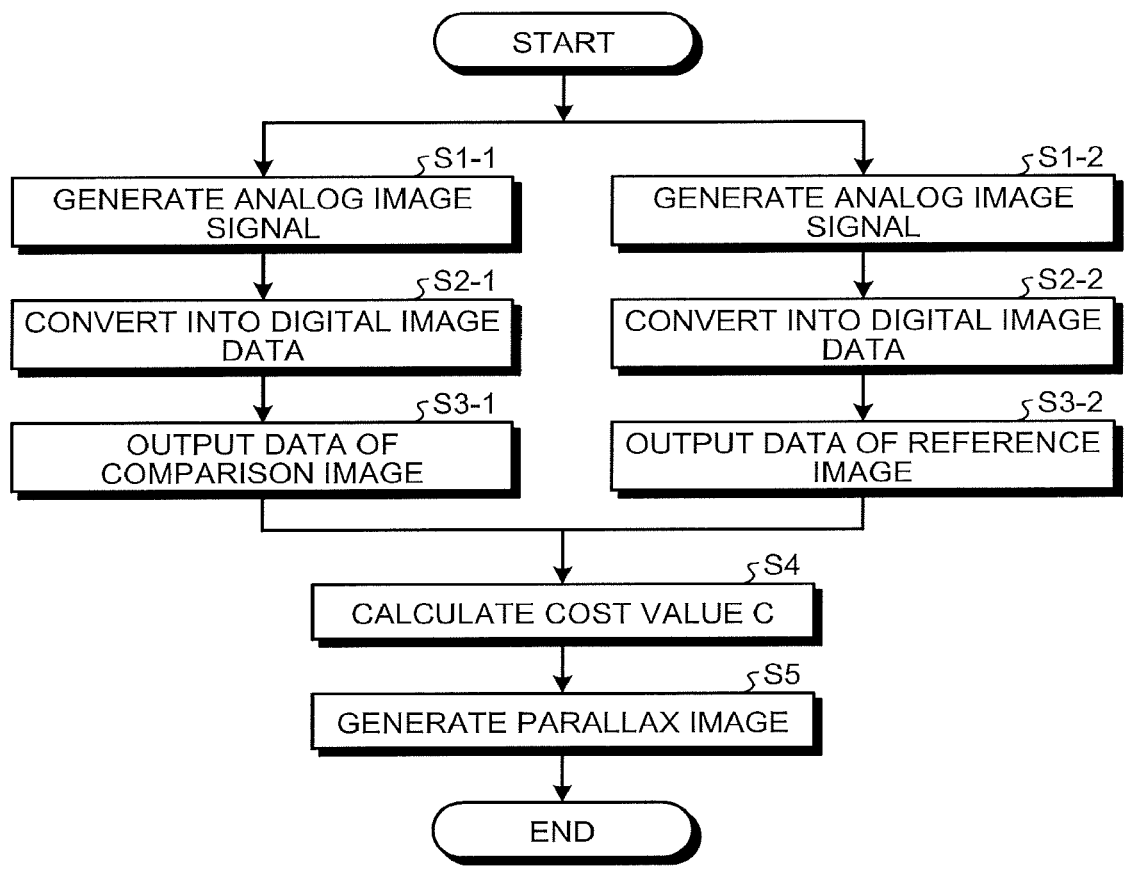
FIG. 24 is a flowchart for explaining an example of the operations in block matching processing performed by a parallax value deriving unit according to the embodiment.

FIG. 24 is a flowchart for explaining an example of the operations in block matching processing performed by the parallax value deriving unit according to the embodiment. Thus, explained with reference to FIG. 24 is a flow of operations in block matching processing performed by the parallax value deriving unit 3 of the object recognizing device 1.

<Step S1-1>

The image obtaining unit 100b of the parallax value deriving unit 3 takes an image of anterior photographic subjects using the left-side camera (the imaging unit 10b); generates analog image signals; and obtains a luminance image representing an image based on the image signals. With that, image signals to be subjected to subsequent image processing are obtained. Then, the system control proceeds to Step S2-1.

<Step S1-2>

The image obtaining unit 100a of the parallax value deriving unit 3 takes an image of anterior photographic subjects using the right-side camera (the imaging unit 10a); generates analog image signals; and obtains a luminance image representing an image based on the image signals. With that, image signals to be subjected to subsequent image processing are obtained. Then, the system control proceeds to Step S2-2.

<Step S2-1>

The converting unit 200b of the parallax value deriving unit 3 removes noise from the analog image signals obtained by imaging by the imaging unit 10b and converts the analog image signals into digital image data. As a result of converting the analog image signals into digital image data, image processing can be performed on a pixel-by-pixel basis with respect to the image based on the image data. Then, the system control proceeds to Step S3-1.

<Step S2-2>

The converting unit 200a of the parallax value deriving unit 3 removes noise from the analog image signals obtained by imaging by the imaging unit 10a and converts the analog image signals into digital image data. As a result of converting the analog image signals into digital image data, image processing can be performed on a pixel-by-pixel basis with respect to the image based on the image data. Then, the system control proceeds to Step S3-2.

<Step S3-1>

The converting unit 200b outputs the image, which is based on the digital image data obtained by conversion at Step S2-1, as the comparison image Ib to be used in the block matching processing. With that, a comparison image is obtained that is to be used in obtaining the parallax values in the block matching processing. Then, the system control proceeds to Step S4.

\<Step S3-2\>

The converting unit 200*a* outputs the image, which is based on the digital image data obtained by conversion at Step S2-2, as the reference image Ia to be used in the block matching processing. With that, a reference image is obtained that is to be used in obtaining the parallax values in the block matching processing. Then, the system control proceeds to Step S4.

\<Step S4\>

Based on the luminance value of the reference pixel p(x, y) in the reference image Ia and based on the luminance value of each candidate pixel q(x+d, y) that represents a candidate for corresponding pixel identified by shifting the pixels by the shift amount d from the pixel corresponding to the position of the reference pixel p(x, y) on the epipolar line EL in the comparison image Ib on the basis of the reference pixel p(x, y), the cost calculating unit 301 of the parallax value computing unit 300 of the parallax value deriving unit 3 calculates and obtains the cost value C(p, d) of that candidate pixel q(x+d, y). More particularly, the cost calculating unit 301 performs the block matching processing and calculates, as the cost value C, the degree of dissimilarity between the reference area pb, which represents a predetermined area centered around the reference pixel p in the reference image Ia, and the candidate area qb (having the same size as the reference area pb), which is centered around the candidate pixel q of the comparison image Ib. Then, the system control proceeds to Step S5.

\<Step S5\>

The decider 302 of the parallax value computing unit 300 of the parallax value deriving unit 3 determines the shift amount d corresponding to the smallest of the cost values C, which are calculated by the cost calculating unit 301, to be the parallax value dp for such pixels in the reference image Ia for which the cost value C was calculated. Then, based on the parallax values dp decided by the decider 302, the first generating unit 303 of the parallax value computing unit 300 of the parallax value deriving unit 3 generates a parallax image in which the pixel value of each pixel in the reference image Ia is substituted with the parallax value dp corresponding to that pixel. Then, the first generating unit 303 outputs the generated parallax image to the recognizing unit 5.

Meanwhile, although the block matching processing described above is explained as an example of the stereo matching processing, that is not the only possible case. Alternatively, the processing using the SGM (Semi-Global Matching) method may be applied.

(Object Recognition Processing Performed by Recognizing Unit)

Figure 25:
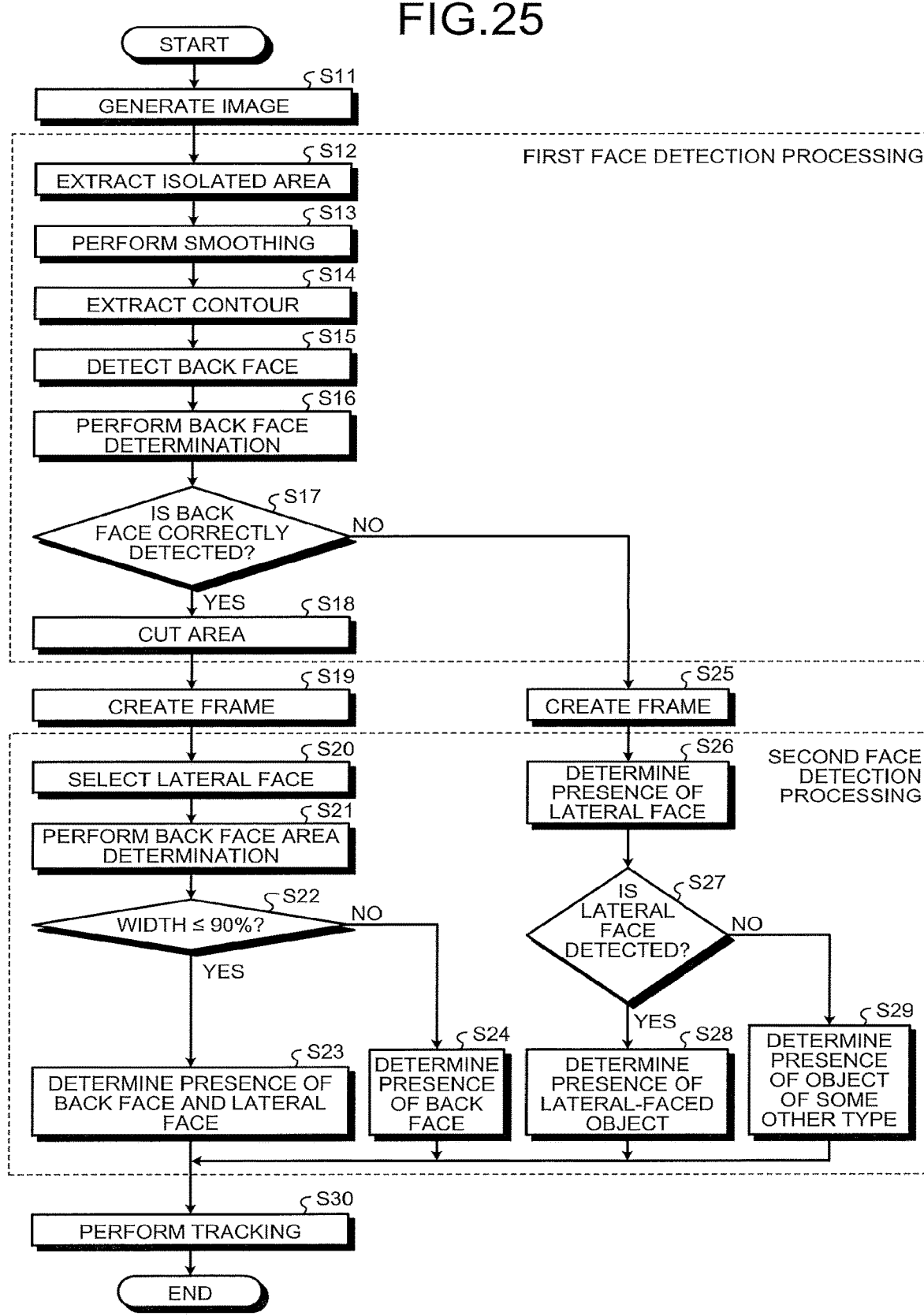
FIG. 25 is a flowchart for explaining an example of the operations in object recognition processing performed by the recognizing unit according to the embodiment.

FIG. 25 is a flowchart for explaining an example of the operations in object recognition processing performed by the recognizing unit according to the embodiment. Thus, explained with reference to FIG. 25 is a flow of operations in object recognition processing performed by the recognizing unit 5 of the object recognizing device 1.

\<Step S11\>

The second generating unit 500 receives input of the parallax image from the parallax value computing unit 300; receives the reference image Ia from the parallax value deriving unit 3; and generates a V-Disparity map, a U-Disparity map, and a Real U-Disparity map. The third generating unit 501 of the second generating unit 500 generates the V map VM, which is a V-Disparity map, for enabling detection of the road surface from the parallax image input from the parallax value computing unit 300. The fourth generating unit 502 of the second generating unit 500 refers to the information positioned only on the upper side of the detected road surface in the V map VM, and generates the U map UM that represents a U-Disparity map and that is to be used in object recognition. The fifth generating unit 503 of the second generating unit 500 generates, from the U map UM generated by the fourth generating unit 502, the real U map RM that represents a Real U-Disparity map in which the horizontal axis is converted into the actual distance. Then, the system control proceeds to Step S12.

\<Step S12\>

The input unit 511 receives input of the reference image Ia and the parallax image that are input from the second generating unit 500; as well as receives input of the V map VM, the U map UM, the U map UM_H, and the real U map RM that are generated by the second generating unit 500. The area extracting unit 513 extracts isolated areas, which represent masses of pixel values, from the real U map RM included in the input information that is output from the input unit 511. The area extracting unit 513 generates, for each extracted isolated area, recognition area information representing information related to that isolated area; and, for example, specifies, in the recognition area information, the identification information in labelling processing and the information about the position and the size of the isolated area in the real U map RM. Then, the area extracting unit 513 sends the generated recognition area information to the smoothing unit 514. Subsequently, the system control proceeds to Step S13.

\<Step S13\>

The smoothing unit 514 performs smoothing with respect to the isolated areas, which are extracted by the area extracting unit 513, for alleviating the noise and the parallax dispersion present in the real U map RM. As a result of filling of pixel values in the isolated areas by the smoothing unit 514, pixel values get filled in the pixels surrounding an original single pixel of each isolated area. Thereinafter, the area formed by combining the original isolated area and the area in which the pixel values are filled with respect to the isolated area is treated as the new isolated area. Then, the smoothing unit 514 specifies, in the recognition area information, the information about the position and the size of each new isolated area in the real U map RM; and sends the recognition area information to the contour extracting unit 515. Subsequently, the system control proceeds to Step S14.

\<Step S14\>

Regarding the pixels forming the contour of each isolated area that has been smoothed by the smoothing unit 514, the contour extracting unit 515 identifies the directional vectors (contour vectors) between adjacent pixels and extracts the contour. As a result of identification of the contour vectors, the pixels forming the contour of each isolated area are assigned with numbers (information) indicating the contour vectors. Then, the contour extracting unit 515 specifies, in the recognition area information, the information about the contour vectors assigned to the pixels forming the contour of each isolated area; and sends the recognition area information to the back face detecting unit 516. Subsequently, the system control proceeds to Step S15.

\<Step S15\>

The back face detecting unit 516 detects the position of the back face and the positions of the lateral faces of each isolated area whose contour has been extracted by the contour extracting unit 515. Then, the back face detecting unit 516 specifies, in the recognition area information, the information about the positions of the back face and the lateral faces (the left lateral face and the right lateral face) as detected in the isolated areas; and sends the recognition area information to the first determining unit 517. Subsequently, the system control proceeds to Step S16.

<Step S16>

The first determining unit 517 determines whether or not the back face detected by the back face detecting unit 516 has been correctly detected, that is, determines the validness of the back face. Then, the system control proceeds to Step S17.

<Step S17>

The first determining unit 517 specifies, in the recognition area information, the result of determination about whether or not the back face detected by the back face detecting unit 516 has been correctly detected, that is, the result of determination about the validness of the back face. If it is determined that the back face is correctly detected (Yes at Step S17), then the first determining unit 517 sends the recognition area information to the cutting unit 518, and the system control proceeds to Step S18. On the other hand, if it is determined that the back face is not correctly detected (No at Step S17), then the first determining unit 517 sends the recognition area information to the frame creating unit 519, and the system control proceeds to Step S25.

<Step S18>

When the first determining unit 517 determines that the back face has validness, the cutting unit 518 cuts (deletes) the areas deemed unnecessary (cut areas) of the isolated area specified in the recognition area information received from the first determining unit 517. Then, the cutting unit 518 specifies, in the recognition area information, information about the position and the size of the post-cutting new isolated area in the real U map RM; and sends the recognition area information to the frame creating unit 519. Subsequently, the system control proceeds to Step S19.

<Step S19>

The frame creating unit 519 uses each such isolated area in the real U map RM which has been extracted by the area extracting unit 513, which has been smoothened by the smoothing unit, whose contour has been extracted by the contour extracting unit 515, whose back face and lateral faces have been detected by the back face detecting unit 516, and whose redundant portion has been cut (deleted) by the cutting unit 518; and creates a frame for the area (recognition area) of such an object in the parallax image (or the reference image Ia) which corresponds to the isolated area. Then, the frame creating unit 519 specifies, in the recognition area information, the information about the frame created in the parallax image (or the reference image Ia); and sends the recognition area information to the second face detecting unit 520. Subsequently, the system control proceeds to Step S20.

<Step S20>

When the first determining unit 517 determines that the back face of the concerned isolated area is correctly detected, the selecting unit 521 makes selection about which one of the two lateral faces detected by the back face detecting unit 516 is to be treated as the lateral face. Then, the selecting unit 521 specifies the information about the selected lateral face in the recognition area information, and sends the recognition area information to the second determining unit 522. Subsequently, the system control proceeds to Step S21.

<Step S21>

The second determining unit 522 determines whether or not the width of the area excluding the lateral face selected by the selecting unit 521 (the width W2 illustrated in FIG. 22) is, for example, equal to or smaller than [90%] of the overall width of the recognition area (the width W1 illustrated in FIG. 22). Then, the system control proceeds to Step S22.

<Step S22>

If the width W2 is equal to or smaller than [90%] of the width W1 (Yes at Step S22), then the system control proceeds to Step S23. However, if the width W2 is greater than [90%] of the width W1 (No at Step S22), then the system control proceeds to Step S24.

<Step S23>

When it is determined that the width W2 is equal to or smaller than [90%] of the width W1, the second determining unit 522 determines that the object in the recognition area is an object (vehicle) having the back face and the lateral faces as the recognizable faces. Then, the second determining unit 522 specifies the determination result in the recognition area information, and sends the recognition area information to the output unit 524. Subsequently, the system control proceeds to Step S30.

<Step S24>

When it is determined that the width W2 is greater than [90%] of the width W1, the second determining unit 522 determines that the object in the recognition area is an object (vehicle) having only the back face as the recognizable face. Then, the second determining unit 522 specifies the determination result in the recognition area information, and sends the recognition area information to the output unit 524. Subsequently, the system control proceeds to Step S30.

<Step S25>

The frame creating unit 519 is a functional unit that uses each such isolated area in the real U map RM which has been extracted by the area extracting unit 513, which has been smoothened by the smoothing unit, whose contour has been extracted by the contour extracting unit 515, and whose back face and lateral faces have been detected by the back face detecting unit 516; and creates a frame for the area (recognition area) of such an object in the parallax image (or the reference image Ia) which corresponds to the isolated area. Then, the frame creating unit 519 specifies, in the recognition area information, the information about the frame created in the parallax image (or the reference image Ia); and sends the recognition area information to the second face detecting unit 520. Subsequently, the system control proceeds to Step S26.

<Step S26>

When the first determining unit 517 determines that the back face of the isolated area has not been correctly detected, the third determining unit 523 determines whether or not the object represented by the isolated area is a lateral-faced object. More particularly, the third determining unit 523 determines whether or not the isolated area (recognition area) satisfies all conditions specified in (Table 5) given above. Then, the system control proceeds to Step S27.

<Step S27>

When the isolated area (recognition area) satisfies all conditions specified in (Table 5) given above (i.e., when a lateral face is detected) (Yes at Step S27), the system control proceeds to Step S28. When the isolated area (recognition area) does not satisfy at least one condition specified in (Table 5) given above (i.e., when a lateral face is not detected) (No at Step S27), the system control proceeds to Step S29.

<Step S28>

When the isolated area (recognition area) satisfies all conditions specified in (Table 5) given above, the third determining unit 523 determines that the object recognized by that isolated area (recognition area) is a lateral-faced object. Then, the third determining unit 523 specifies the determination result in the recognition area information, and sends the recognition area information to the output unit 524. Subsequently, the system control proceeds to Step S30.

<Step S29>

When the isolated area (recognition area) does not satisfy at least one condition specified in (Table 5) given above, the third determining unit 523 determines that the object represented by the isolated area (recognition area) not a lateral-faced object (i.e., the object is of some other type). Then, the third determining unit 523 specifies the determination result in the recognition area information, and sends the recognition area information to the output unit 524. Subsequently, the system control proceeds to Step S30.

<Step S30>

Based on the recognition area information representing the information related to the object recognized by the clustering unit 510, the tracking unit 530 performs tracking processing for rejecting that object or tracking that object.

As a result of performing the processing from Step S11 to Step S30 described above, the object recognition processing is carried out. Herein, the processing from Step S13 to Step S30 are performed for each isolated area extracted at Step S12.

As described above, in the object recognition processing performed by the recognizing unit 5, a U-Disparity map is used that is represented by either a real U map (for example, the real U map RM mentioned above) or a U map (for example, the U map UM or the U map UM1 mentioned above) and that is different according to the objective of image processing. Consequently, it becomes possible to enhance the accuracy and the processing speed of image processing in the object recognition processing. For example, in the first face detection processing for detecting the back face and the lateral faces of an object, as a result of using a real U map, since the actual distance is treated as the horizontal axis and since the object does not change its shape according to the angle of view and has the same features at any distance, recognition of the object and detection of the faces thereof can be performed in a stable manner at any distance. As a result, the accuracy and the processing speed of image processing can be enhanced. Moreover, during the second face detection processing for specifically identifying the areas of the back face and the lateral faces of the object and identifying the types of faces of the object, particularly in the processing of determining whether or not the object represented by the isolated area is a lateral-faced object; as a result of using a U map, since the x-axis of the reference image Ia represents the horizontal axis and since the features of inclined portions are easily detectable, the determination about whether or not the object is a lateral-faced object can be performed with accuracy. Hence, the accuracy and the processing speed of image processing can be enhanced.

Meanwhile, in the embodiment described above, although the cost value C is an evaluation value representing the degree of dissimilarity, it can alternatively be an evaluation value representing the degree of similarity. In that case, the shift amount d corresponding to the greatest cost value C (extreme value), which represents the degree of similarity, serves as the parallax value P.

Moreover, in the embodiment described above, the explanation is given for the object recognizing device 1 that is installed in an automobile represented by the vehicle 70. However, that is not the only possible case. Alternatively, for example, the object recognizing device 1 can be installed in some other type of vehicle such as a motorbike, a bicycle, a wheelchair, or a farming tiller. Furthermore, instead of treating a vehicle as an example of a moving object, a robot can also be used.

Meanwhile, in the embodiment described above, when at least some of the functional units of the parallax value deriving unit 3 and the recognizing unit 5 in the object recognizing device 1 are implemented as a result of execution of a program, that program is stored in advance in a ROM. Alternatively, the program executed in the object recognizing device 1 according to the embodiment described above can be recorded as an installable file or an executable file in a computer-readable recording medium such as a CD-ROM, a flexible disk (FD), a CD-R, or a DVD. Still alternatively, the program executed in the object recognizing device 1 according to the embodiment described above can be stored in a downloadable manner in a computer connected to a network such as the Internet. Still alternatively, the program executed in the object recognizing device 1 according to the embodiment described above can be distributed via a network such as the Internet. Meanwhile, the program executed in the object recognizing device 1 according to the embodiment described above contains modules of at least some of the functional units explained earlier. As far as the actual hardware is concerned, the CPU 52 (or the CPU 32) reads the program from the ROM 53 (or the ROM 33) and executes it so that the functional units are loaded and generated in a main memory device (the RAM 54 (or the RAM 34).

According to an embodiment, it becomes possible to achieve enhancement in the accuracy and the processing speed of image processing by virtue of using different U-Disparity maps according to the objective of image processing.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

REFERENCE SIGNS LIST 1 object recognizing device
2 main body
3 parallax value deriving unit
4 communication line
5 recognizing unit
6 vehicle control device
7 steering wheel
8 brake pedal
10a, 10b imaging unit
11a, 11b imaging lens
12a, 12b aperture
13a, 13b image sensor
20a, 20b signal converting unit
21a, 21b CDS
22a, 22b AGC
23a, 23b ADC
24a, 24b frame memory
30 image processing unit
31 FPGA
32 CPU
33 ROM
34 RAM
35 I/F
39 bus line
51 FPGA
52 CPU
53 ROM
54 RAM
55 I/F
58 CAN I/F
59 bus line
60 device control system
70 vehicle
100a, 100b image obtaining unit
200a, 200b converting unit
300 parallax value computing unit
301 cost calculating unit
302 decider
303 first generating unit
500 second generating unit
501 third generating unit
502 fourth generating unit
503 fifth generating unit
510 clustering unit
511 input unit
512 first face detecting unit
513 area extracting unit
514 smoothing unit
515 contour extracting unit
516 back face detecting unit
517 first determining unit
518 cutting unit
519 frame creating unit
520 second face detecting unit
521 selecting unit
522 second determining unit
523 third determining unit
524 output unit
530 tracking unit
600 road surface
600a road surface portion
601 utility pole
601a utility pole portion
602 vehicle
602a vehicle portion
611 left-side guardrail
611a to 611c left-side guardrail portion
612 right-side guardrail
612a to 612c right-side guardrail portion
613 vehicle
613a to 613c vehicle portion
614 vehicle
614a to 614c vehicle portion
621 to 624 isolated area
B base length
C cost value
ch cut length
cw cut width
d shift amount
DF detection area
DF1 to DF4 detection frame
DF1a, DF4a detection frame
diff difference
dsp_diff distance difference
dp parallax value
dp1 to dp4 back face position
E object
EL epipolar line
f focal length
Ia reference image
Ib comparison image
Ip, Ip1 parallax image
len depth
p reference pixel
PA1, PA2 bulging area
pb reference area
q candidate pixel
qb candidate area
RM real U map
S, Sa, Sb point
UM, UM1 U map
UM_H U map
VM V map
w_b width
W1, W2 width
xa1 to xa3 left position
xb1 to xb3 right position
x1 left lateral face position
x2 right lateral face position
Z distance

What is claimed is:
1. An image processing device configured to process a plurality of taken images imaged by a plurality of imaging units configured to take images in a travelling direction of a moving object, the image processing device comprising:
  a first generating unit configured to generate, based on a distance image generated from the plurality of taken images and made from distance values, a first image indicating a frequency distribution of the distance values corresponding to the travelling direction of the moving object, the frequency distribution associating actual distances in a direction orthogonal to the travelling direction with the distance values;
  a second generating unit configured to generate, based on the distance image, a second image indicating a frequency distribution of the distance values corresponding to the travelling direction of the moving object, the frequency distribution associating a horizontal direction of the distance image with the distance values;
  a first extracting unit configured to extract a first area representing an object, from the first image;
  a first processing unit configured to perform first processing to detect a face of the object represented by the first area, using at least the first image; and
  a second processing unit configured to perform second processing to identify a type of the face of the object represented by the first area, using at least the second image.

2. The image processing device according to claim 1, wherein the first processing unit includes a second extracting unit configured to, as part of the first processing, extract contour directions of a contour of the first area in the first image.

3. The image processing device according to claim 2, wherein the second extracting unit is configured to identify directions between adjacent pixels regarding pixels forming the contour of the first area in the first image, and extract the directions as the contour directions.

4. The image processing device according to claim 2, wherein the second extracting unit is configured to change sequence of extracting the contour directions of the first area, based on a direction in which the first area is scanned in the first image.

5. The image processing device according to claim 2, wherein the first processing unit further includes:
  a detecting unit configured to, as part of the first processing, detect a first face that is present in the first area of the first image and that is positioned opposite to the image processing device, based on the contour directions extracted by the second extracting unit, and
  a deleting unit configured to, as part of the first processing, delete at least a second area located nearer than the first face, from the first area in the first image, to set a new first area.

6. The image processing device according to claim 5, wherein the detecting unit is configured to, as part of the first processing, detect two second faces connected to both ends of the first face, based on contour directions in an area in the first area in the first image, the area ranging from the first face to a predetermined position in a direction moving away from the image processing device.

7. The image processing device according to claim 1, wherein the second processing unit is configured to, as part of the second processing, determine whether or not an object represented by the first area is a lateral-faced object, based on distance values included in a third area which corresponds to the first area and which is present in the second image.

8. An object recognizing device comprising:
  a first imaging unit configured to image a photographic subject to obtain a first taken image;
  a second imaging unit disposed at a different position than a position of the first imaging unit and configured to image the photographic subject to obtain a second taken image;
  a third generating unit configured to generate the distance image based on distance values obtained with respect to the photographic subject from the first taken image and the second taken image; and
  the image processing device according to claim 1.

9. A device control system comprising:
  the object recognizing device according to claim 8; and
  a control device configured to control a control target based on at least the face detected by the first processing unit regarding the first area extracted by the first extracting unit.

10. An image processing method implemented in an image processing device configured to process a plurality of taken images imaged by a plurality of imaging units configured to take images in a travelling direction of a moving object, the image processing method comprising:
  first generating, based on a distance image generated from the plurality of taken images and made from distance values, a first image indicating a frequency distribution of the distance values corresponding to the travelling direction of the moving object, the frequency distribution associating actual distances in a direction orthogonal to the travelling direction with the distance values;
  second generating, based on the distance image, a second image indicating a frequency distribution of the distance values corresponding to the travelling direction of the moving object, the frequency distribution associating a horizontal direction of the distance image with the distance values;
  first extracting a first area representing an object, from the first image;
  performing first processing to detect a face of the object represented by the first area, using at least the first image; and
  performing second processing to identify a type of the face of the object represented by the first area, using at least the second image.

11. A non-transitory computer-readable medium including programmed instructions that causes a computer to function as:
  a first generating unit configured to generate, based on a distance image generated from a plurality of taken images imaged by a plurality of imaging units configured to take images in a travelling direction of a moving object, and made from distance values, a first image indicating a frequency distribution of the distance values corresponding to the travelling direction of the moving object, the frequency distribution associating actual distances in a direction orthogonal to the travelling direction with the distance values;
  a second generating unit configured to generate, based on the distance image, a second image indicating a frequency distribution of the distance values corresponding to the travelling direction of the moving object, the frequency distribution associating a horizontal direction of the distance image with the distance values;
  a first extracting unit configured to extract a first area representing an object, from the first image;

a first processing unit configured to perform first processing to detect a face of the object represented by the first area, using at least the first image; and a second processing unit configured to perform second processing to identify a type of the face of the object represented by the first area, using at least the second image.

12. A moving object comprising the device control system according to claim 9, and configured to be controlled by the control device.

* * * * *